United States Patent
Asai et al.

(10) Patent No.: US 10,539,684 B2
(45) Date of Patent: Jan. 21, 2020

(54) RADIATION IMAGING APPARATUS, RADIATION IMAGING SYSTEM, CONTROL METHOD OF RADIATION IMAGING APPARATUS, AND NON-TRANSITORY COMPUTER-READABLE STORAGE MEDIUM

(71) Applicant: CANON KABUSHIKI KAISHA, Tokyo (JP)

(72) Inventors: Hiroki Asai, Kawasaki (JP); Toshikazu Tamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 15/944,204

(22) Filed: Apr. 3, 2018

(65) Prior Publication Data

US 2018/0292545 A1  Oct. 11, 2018

(30) Foreign Application Priority Data

Apr. 5, 2017 (JP) .................................. 2017-075446
Apr. 10, 2017 (JP) .................................. 2017-077733

(51) Int. Cl.
*G01T 1/175* (2006.01)
*G06T 5/50* (2006.01)
(Continued)

(52) U.S. Cl.
CPC ............ *G01T 1/175* (2013.01); *G01T 1/2006* (2013.01); *G06T 5/50* (2013.01); *H02J 7/0047* (2013.01)

(58) Field of Classification Search
CPC ...... G01T 1/175; G01T 1/2006; H02J 7/0047; H02J 7/0068; H02J 7/0063; G06T 5/50
(Continued)

(56) References Cited

U.S. PATENT DOCUMENTS 7,492,865 B2  2/2009 Hahm et al.
9,606,246 B2  3/2017 Naito
(Continued)

FOREIGN PATENT DOCUMENTS

JP  2006158728 A  6/2006
JP  2010-029419 A  2/2010
(Continued)

OTHER PUBLICATIONS

U.S. Appl. No. 15/923,093, Toshikazu Tamura, filed Mar. 16, 2017.

*Primary Examiner* — David P Porta
*Assistant Examiner* — Gisselle M Gutierrez
(74) *Attorney, Agent, or Firm* — Venable LLP

(57) ABSTRACT

A radiation imaging apparatus having a battery and being operable in at least one of a plurality of power supply forms including the battery and an external power source, the apparatus comprising: a power control unit configured to determine the power supply form; and a control unit configured to control an operation of the radiation imaging apparatus, wherein in accordance with the power supply form, the control unit switches between a first obtaining mode of obtaining offset correction data after imaging of an object for each imaging of the object and a second obtaining mode of obtaining offset correction data obtained in advance before imaging of an object is done, and the control unit switches to the first obtaining mode if power is supplied from the battery and switches to the second obtaining mode if power is supplied from the external power source.

13 Claims, 14 Drawing Sheets

(51) Int. Cl.
*H02J 7/00* (2006.01)
*G01T 1/20* (2006.01)

(58) Field of Classification Search
USPC .......................................................... 378/101
See application file for complete search history.

(56) References Cited

U.S. PATENT DOCUMENTS

| | | | |
|---|---|---|---|
| 9,615,811 | B2 | 4/2017 | Yamanaka |
| 9,736,406 | B2 * | 8/2017 | Kimura ................... H04N 5/378 |
| 9,921,319 | B2 | 3/2018 | Asai et al. |
| 2003/0001544 | A1 * | 1/2003 | Nakanishi ............. H02J 7/0047 320/162 |
| 2010/0020933 | A1 * | 1/2010 | Topfer ...................... G06T 5/50 378/98.11 |
| 2011/0317054 | A1 | 12/2011 | Kameshima et al. |
| 2015/0310597 | A1 * | 10/2015 | Ohguri ................. H04N 5/2254 382/275 |
| 2016/0358330 | A1 | 12/2016 | Asai |
| 2016/0370304 | A1 | 12/2016 | Asai |
| 2018/0284301 | A1 * | 10/2018 | Yamazaki ............... G01T 1/247 |
| 2018/0368789 | A1 * | 12/2018 | Shimizukawa ...... A61B 6/4283 |

FOREIGN PATENT DOCUMENTS

| | | | |
|---|---|---|---|
| JP | 4557697 | A | 10/2010 |
| JP | 2012-183241 | A | 9/2012 |
| JP | 2016-095278 | A | 5/2016 |

* cited by examiner

RADIATION IMAGING APPARATUS, RADIATION IMAGING SYSTEM, CONTROL METHOD OF RADIATION IMAGING APPARATUS, AND NON-TRANSITORY COMPUTER-READABLE STORAGE MEDIUM

BACKGROUND OF THE INVENTION

Field of the Invention

The present invention relates to a radiation imaging apparatus, a radiation imaging system, control method of the radiation imaging apparatus, and a non-transitory computer-readable storage medium.

Description of the Related Art

As a radiation imaging apparatus that obtains a radiation image by using radiation (X-rays or the like) transmitted through an object, a radiation imaging apparatus that can display a radiation image in real time has been widely used. In addition, a flat panel type radiation imaging apparatus (FPD) has been proposed.

The FPD detects a radiation irradiation amount during an arbitrary accumulation time as a charge amount. For this reason, if charge irrelevant to irradiation with radiation exists in a radiation detector at the time of obtaining a radiation image of an object, this charge is superimposed as noise on the radiation image. This causes a deterioration in the image quality.

Japanese Patent No. 4557697 has proposed a technique for obtaining offset correction data by determining the stability and variation amount of offset correction data with respect to time, in order to hold the accuracy of offset correction processing for removing an offset component owing to noise accumulated during imaging for a radiation image. U.S. Pat. No. 7,492,865 has proposed a technique for switching between methods of obtaining offset correction data depending on whether to obtain a moving image or still image. Japanese Patent Laid-Open No. 2016-95278 has proposed a technique for reducing temperature fluctuations affecting offset correction processing by always performing the same operation regardless of frame rates.

Although each technique described in Japanese Patent No. 4557697 to Japanese Patent Laid-Open No. 2016-95278 has disclosed the method of obtaining the offset correction data to maintain the accuracy of offset correction processing, a consideration regarding a power supply form has not been made. Therefore, the offset correction data needs to be obtained periodically also in the case of a limited energy supply source such as power supply from a battery, or power is consumed except for an operation needed for imaging in order to reduce the temperature fluctuations, limiting the possible imaging time and the possible number of frames that can be obtained. Thus, in the related art, it is impossible to perform appropriate offset correction considering the form of power supply to the radiation imaging apparatus, impairing user convenience.

The present invention has been made in consideration of the above-described problems. The present invention provides a technique for implementing appropriate offset correction considering the form of power supply to the radiation imaging apparatus.

SUMMARY OF THE INVENTION

According to one aspect of the present invention, there is provided a radiation imaging apparatus having a battery and being operable in at least one of a plurality of power supply forms including the battery and an external power source, the apparatus comprising: a power control unit configured to determine the power supply form; and a control unit configured to control an operation of the radiation imaging apparatus, wherein in accordance with the power supply form, the control unit switches between a first obtaining mode of obtaining offset correction data after imaging of an object for each imaging of the object and a second obtaining mode of obtaining offset correction data obtained in advance before imaging of an object is done, and the control unit switches to the first obtaining mode if power is supplied from the battery and switches to the second obtaining mode if power is supplied from the external power source.

Further features of the present invention will become apparent from the following description of exemplary embodiments with reference to the attached drawings.

DESCRIPTION OF THE EMBODIMENTS

Figure 1:
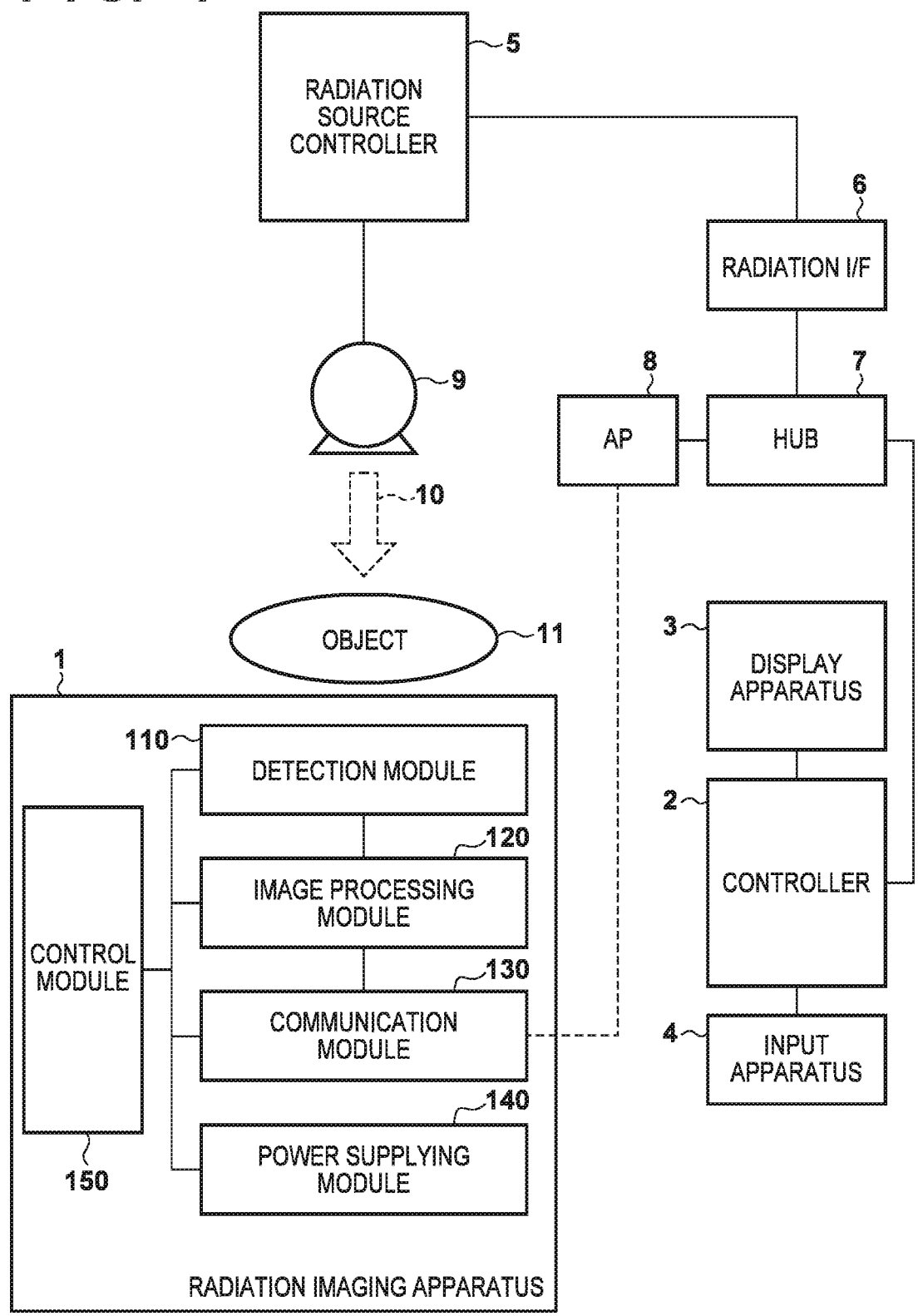
FIG. 1 is a block diagram showing an example of the arrangement of a radiation imaging system according to an embodiment of the present invention.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)
<Outline>

In the first embodiment, an example in which the first obtaining mode of obtaining offset correction data after imaging of an object for each imaging of the object and the second obtaining mode of obtaining offset correction data obtained in advance before imaging of an object are switched in accordance with the form of power supply to a radiation imaging apparatus will be described. More specifically, a mode of obtaining offset correction data is switched to the first obtaining mode if power is supplied from a battery, and switched to the second obtaining mode if power is supplied from an external power source. Note that in this specification, radiation is not limited to X-rays and may be, for example, an electromagnetic wave, α-rays, β-rays, or γ-rays.

<Offset Correction>

A radiation imaging apparatus (FPD) is formed by arraying minute radiation detectors on a silica glass substrate in a matrix pattern. Each radiation detector is formed by stacking a solid-state photodetector having an amorphous semiconductor sandwiched between a transparent conductive film and a conductive film and a scintillator that converts radiation into visible light. There is known an FPD using, as a solid-state photodetector, a photodetector such as a CCD or CMOS. A radiation detector is also known, which directly detects radiation by using a solid-state detector without using any scintillator.

An FPD detects a radiation irradiation amount during an arbitrary accumulation time as a charge amount. For this reason, if charge irrelevant to irradiation with radiation exists in a radiation detector at the time of obtaining a radiation image of an object, this charge is superimposed as noise on the radiation image. This causes a deterioration in the image quality of the radiation image.

An example of charge behaving as noise is residual charge that remains based on the characteristics of a solid-state detector or scintillator after preceding imaging for a radiation image. Another example of charge behaving as noise is dark current caused by charge generated by a solid-state photodetector mainly due to the influence of temperature. The image quality of a radiation image is also degraded by fixed noise caused by a defect unique to a radiation detector.

At the time of obtaining a radiation image of an object, residual charge and charge corresponding to a dark current component are also accumulated in proportion to the accumulation time of an image during irradiation with radiation. This causes a deterioration in the image quality of the radiation image. For this reason, in obtaining a radiation image of an object, offset correction processing is performed to correct offset components caused by residual charge accumulated during imaging, dark current charge, fixed noise, and the like.

In general, offset correction processing is performed by subtracting, from the radiation image, offset correction data that is image data (non-exposure image data) obtained by imaging without irradiation with radiation.

A general FPD tends to undergo instability in dark current charge immediately after the start of driving of a radiation detector or immediately after irradiation with radiation. It is also known that residual charge generated immediately after irradiation with radiation rapidly changes especially immediately after the completion of irradiation with radiation. This makes it necessary to ensure a predetermined time in the interval from the start of driving of the radiation detector to imaging for a radiation image or the interval from imaging for a preceding radiation image to imaging for a next radiation image, in order to execute stable offset correction processing. On the other hand, in order to improve the operability of the radiation imaging apparatus, it is desired to obtain a radiation image in a short time immediately after the start of driving or immediately after imaging for a radiation image.

<Arrangement of Radiation Imaging System>

FIG. 1 is a block diagram showing an example of a radiation imaging system according to an embodiment of the present invention. In FIG. 1, reference numerals 1 denote a radiation imaging apparatus; 2, a controller; 3, a display apparatus; 4, an input apparatus; 5, a radiation source controller; 6, a radiation interface unit I/F; 7, a HUB; 8, an access point AP; 9, a radiation source; 10, radiation; and 11, an object. The radiation imaging system according to the first embodiment includes at least the radiation imaging apparatus 1 and the controller 2 among the constituent elements shown in FIG. 1.

The radiation imaging apparatus 1 is an apparatus that obtains the radiation image data of the object 11 based on the radiation 10 transmitted through the object 11 emitted by the radiation source 9. For example, a radiation imaging apparatus using an FPD (Flat Panel Detector) can be used for the radiation imaging apparatus 1. The radiation imaging apparatus 1 is operable in at least one of a plurality of power supply forms each including a battery and an external power source. The radiation imaging apparatus 1 includes a radiation detection module 110, an image processing module 120, a communication module 130, a power supplying module 140, and a control module 150. The radiation imaging apparatus 1 operates by power supplied from the power supplying module 140, and the control module 150 controls the entire apparatus.

The detection module 110 converts reached radiation into an electric signal. The converted electric signal is digitized and sent to the image processing module 120 to be subjected to various types of processing including offset correction. The processed signal is sent to the communication module 130. Then, the signal is transmitted as image data to the controller 2 arranged outside via a communication interface. The controller 2 may be connected to the display apparatus 3 such as display for displaying a menu for control and image data after imaging and the input apparatus 4 such as a mouse and a keyboard for performing various types of input operations.

The controller 2 is a unit configured to perform various types of control operations such as control on the operation of the radiation imaging system, imaging modes, and the like and control on processing of image data obtained by the radiation imaging apparatus 1. One of various types of computers and workstations can be used. The radiation source 9 is constituted by an electron gun for generating the radiation 10 such as X-rays, a rotor, and the like. Electrons collide with the rotor while being accelerated by the high voltage generated by the radiation source controller 5 to generate X-rays.

The radiation imaging apparatus 1 and the controller 2 communicate with each other via a wireless LAN via the access point (referred to as the AP in FIG. 1) 8 in FIG. 1. The radiation imaging apparatus 1 and the controller 2 may directly communicate with each other not via the access point 8 by making one of them serve as an access point. Alternatively, the radiation imaging apparatus 1 and the controller 2 may communicate with each other via another wireless communication unit such as Bluetooth®. Alternatively, the radiation imaging apparatus 1 and the controller 2 may communicate with each other via a wired communication unit such as Ethernet®.

The radiation interface unit (referred to as the radiation I/F in FIG. 1) 6 is provided between the controller 2 and the radiation source controller 5. The radiation interface unit 6 holds a circuit that mediates communication performed between the radiation imaging apparatus 1 and the radiation source controller 5, and relays exchange of a synchronization signal. The radiation I/F 6 can adjust the irradiation timing of radiation from the radiation source 9 in accordance with, for example, the state of the radiation imaging apparatus 1 by monitoring the states of the radiation imaging apparatus 1 and the radiation source controller 5. Furthermore, the radiation I/F 6 is also connected to the controller 2 to relay exchange of various types control signals and information.

The radiation interface unit 6 is connected to the controller 2 by Ethernet® via the HUB 7. The HUB 7 is a unit for connection to a plurality of network devices. Furthermore, the radiation interface unit 6 is also connected to the radiation imaging apparatus 1 via a wireless LAN by connecting the access point 8 to the HUB 7.

<Arrangement of Radiation Imaging Apparatus>

Figure 2:
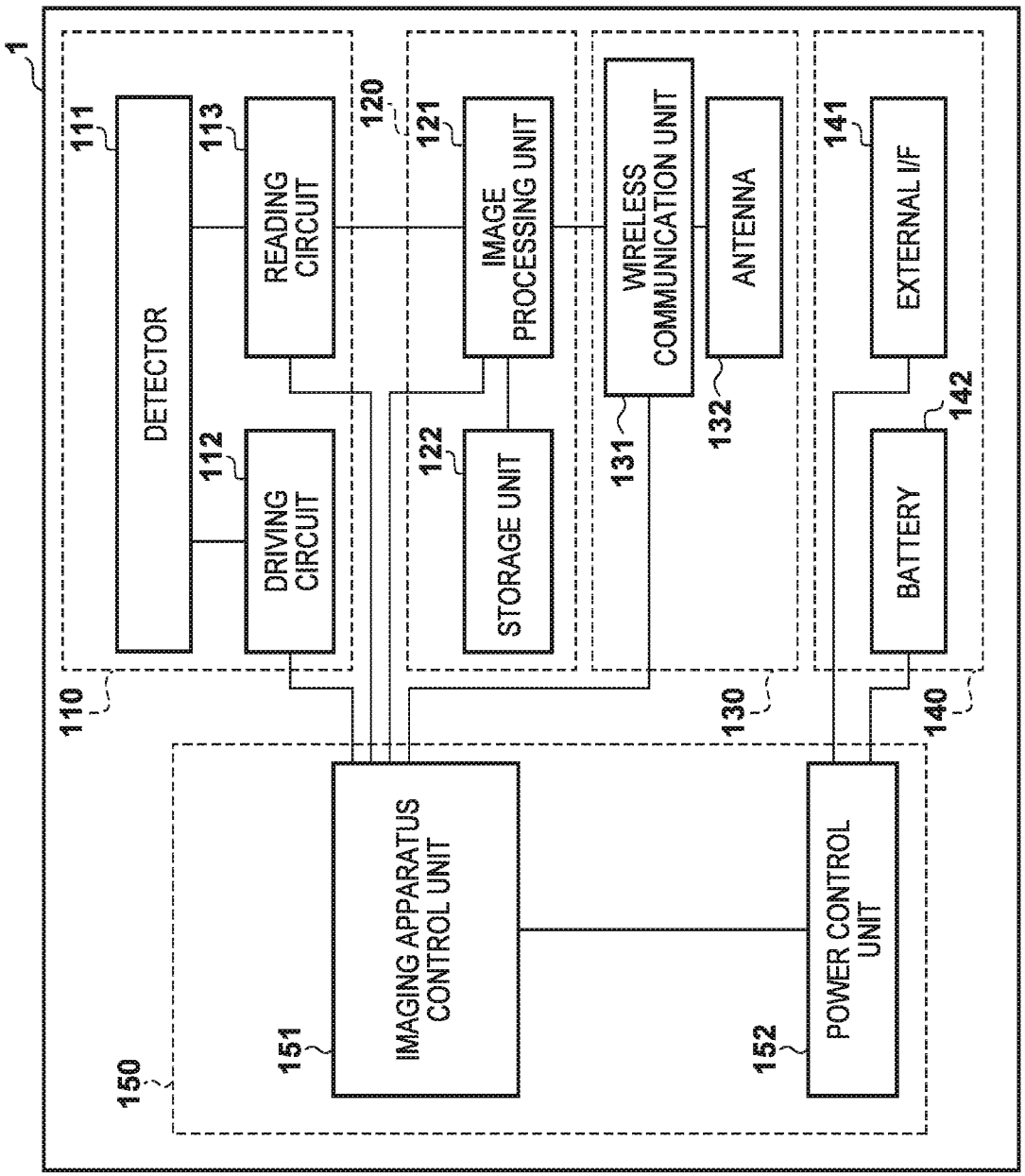
FIG. 2 is a block diagram showing an example of the arrangement of a radiation imaging apparatus according to the embodiment of the present invention.

FIG. 2 is a block diagram schematically showing an example of the arrangement of the radiation imaging apparatus 1 according to this embodiment. The detection module 110 includes a detector 111, a driving circuit 112, a reading circuit 113, and the like. The detector 111 includes a scintillator and a photodetector array (not shown), can detect radiation and generates image data. The scintillator emits fluorescence in a visible region by using recombination energy generated when the mother substance of a phosphor is excited by high-energy radiation transmitted through an object and recombination occurs. This fluorescence is generated by a mother substance itself such as $CaWO_4$ or $CdWO_4$ or a luminescence center substance added in the mother substance, such as CsI:Tl or ZnS:Ag. The photodetector array outputs an electric signal corresponding to the amount of fluorescence (the dose of radiation incident on the scintillator) detected by each pixel constituting the photodetector array in accordance with the operation of the driving circuit 112. The reading circuit 113 amplifies electric signals output from the photodetector array by using the amplifier IC, as needed, and outputs image data by converting the signal into a digital signal using the A/D converter.

The image processing module 120 includes an image processing unit 121, a storage unit 122, and the likes. The image processing unit 121 applies image processing such as gain processing and offset correction processing to image data output from the reading circuit 113. The image processing unit 121 performs the offset correction processing by subtracting, from the radiation image, offset correction data (non-exposure image data) stored in the storage unit 122 under the control of the control module 150. The image processing unit 121 may apply other types of basic image processing such as gain correction processing to obtain low-noise radiation image data. The image processing unit 121 may further apply image processing including image quality adjustment requested by a user such as tone correction.

The storage unit 122 stores image data output from the reading circuit 113 or the image processing unit 121, image data for correction processing of the image processing unit 121 (offset correction data, gain correction data, defect information, and the like), and the like. No limitations are imposed on how the storage unit 122 is implemented in practice. The storage unit 122 may be implemented by one or a plurality of memories or HDDs, or various combinations of volatile and nonvolatile memories.

The data processed by the image processing unit 121 is sent to the communication module 130.

The communication module 130 includes a wireless communication unit 131, an antenna 132, and the like. The wireless communication unit 131 is a unit configured to wirelessly transmit the image data and the like processed by the image processing unit 121 to the external controller 2 and the like, and is connected to the antenna 132.

The power supplying module 140 includes an external interface (referred to as an external I/F in FIG. 2) 141, a battery 142, and the like. The control module 150 includes an imaging apparatus control unit 151 and a power control unit 152. The imaging apparatus control unit 151 is a unit that performs processing regarding control of the respective units in the radiation imaging apparatus 1. For example, the imaging apparatus control unit 151 outputs an instruction to obtain a radiation image to the driving circuit 112 and outputs, to the image processing unit 121, an instruction to apply predetermined image processing to the obtained radiation image. In this case, the imaging apparatus control unit 151 gives an instruction to switch modes of obtaining the offset correction data in accordance with a power supply form, which is transferred from the power control unit 152 (for example, whether power is fed from the external interface 141 or the battery 142).

Out of a plurality of modes of obtaining offset correction data, there is, for example, the first obtaining mode of obtaining offset correction data (non-exposure image data) after imaging of an object. More specifically, in the first obtaining mode, the offset correction data is obtained during continuous imaging of the object. That is, in the first obtaining mode, imaging for the radiation image of the object and obtaining of the offset correction data are performed alternately. Then, offset correction processing is performed by subtracting the offset correction data from the radiation image.

There is also the second obtaining mode of obtaining offset correction data (non-exposure image data) obtained in advance before imaging of an object. Then, offset correction processing is performed by subtracting the offset correction data from a radiation image.

The imaging apparatus control unit 151 switches, in accordance with the power supply form, between the first obtaining mode of obtaining the offset correction data after imaging of the object for each imaging of the object and the second obtaining mode of obtaining the offset correction data obtained in advance before imaging of the object. More specifically, the imaging apparatus control unit 151 switches to the first obtaining mode if power is supplied from the battery 142, and switches to the second obtaining mode if power is supplied from the external interface 141 (external power source). The reason is as follows.

When power is fed from the external interface 141, it is expected to stably supply power from outside the radiation imaging apparatus 1, such as a commercial power supply, whereas when power is not fed from the external interface 141, power is fed from the battery 142 as a limited energy supply source.

The frame rate can be increased in performing offset correction upon obtaining offset correction data before imaging for a radiation image of an object (second obtaining mode), making it possible to perform high-speed continuous imaging such as moving-image capturing. However, a dark current charge changes due to the influences of the temperature of a radiation detector, imaging conditions, the temporal degradation of a sensor, and the like. It is difficult to ensure sufficient accuracy for offset correction processing because of the influences of imaging conditions such as temperature fluctuations. It is therefore necessary to periodically obtain offset correction data in all the imaging modes. Alternatively, it is necessary to always perform an imaging operation so as to almost eliminate temperature fluctuations. Consequently, in a method of obtaining offset correction data in advance before imaging of an object, higher power is consumed than a method of obtaining offset correction data after imaging of an object for each imaging of the object, that is, offset correction that alternately performs imaging of an object and obtaining of offset correction data.

When power is fed from the external interface 141, the mode of obtaining offset correction data is switched to the second obtaining mode of obtaining offset correction data in advance before imaging for a radiation image of an object. Then, offset correction is performed by using the obtained offset correction data, making it possible to cope with high frame rate imaging as well.

On the other hand, a power capacity is limited when power is fed from the battery 142, switching to the first obtaining mode of obtaining offset correction data after imaging of an object for each imaging of the object. Then, by alternately performing imaging for the radiation image of the object and obtaining of the offset correction data, offset correction is performed by using obtained offset correction data, preventing reductions in possible imaging time and possible number of frames that can be obtained. When imaging for the radiation image of the object and obtaining of the offset correction data are performed alternately, the frame rate is decreased, but an image lag can be reduced.

The power control unit 152 is a unit configured to control the operating power source of the radiation imaging apparatus 1. Upon receiving power supplied from the battery 142 or the external interface 141, the power control unit 152 generates various types of power necessary for the operation of the radiation imaging apparatus 1 and supplies the power to each unit. The power control unit 152 detects whether power is supplied from the external interface 141 and transfers this information to the imaging apparatus control unit 151. In addition, the power control unit 152 detects the remaining capacity of the battery 142. Furthermore, the power control unit 152 may have a function for controlling the charging of the battery 142.

A determination of whether power is supplied from the external interface 141 can be implemented by providing a detection mechanism for the insertion/removal of a power supply cable, for example, a detection signal for the external interface 141. Alternatively, it can also be implemented by detecting the input of power equal to or higher than a predetermined voltage to a power supply line.

The imaging apparatus control unit 151 and the power control unit 152 each may be implemented by software such as a CPU or may be controlled by a control signal generating circuit such as an ASIC. In addition, the imaging apparatus control unit 151 and the power control unit 152 each may be implemented by both a program and a control circuit.

<Processing>

Figure 3:
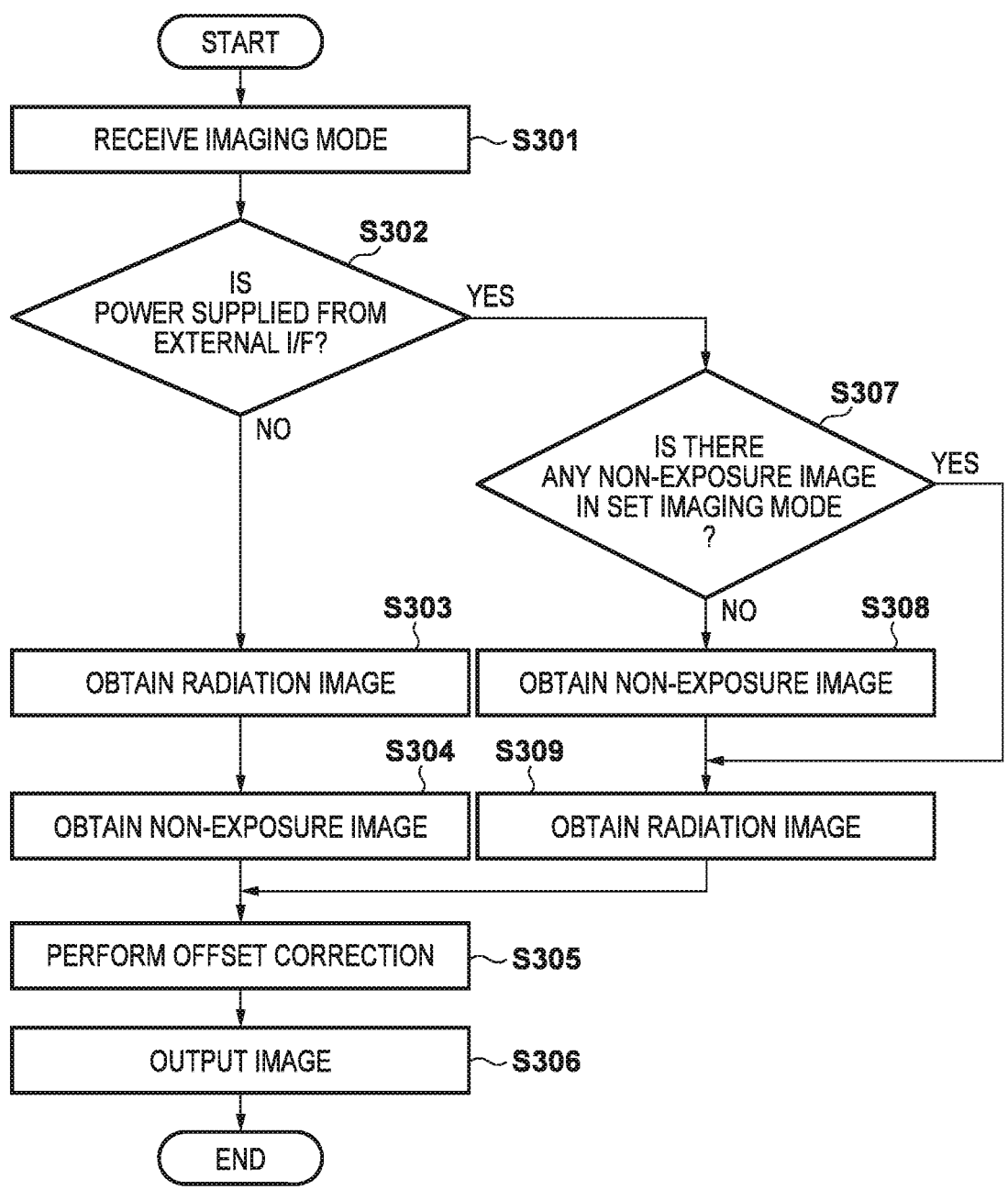
FIG. 3 is a flowchart showing a procedure for image processing according to the first embodiment.

A procedure for image processing including offset correction processing will be described next with reference to FIG. 3. FIG. 3 is a flowchart showing an example of the operation of the radiation imaging apparatus according to the embodiment. In step S301, the user inputs an imaging mode for obtaining a radiation image of an object from the input apparatus 4, and the radiation imaging apparatus 1 receives the imaging mode via the controller 2, the HUB 7, and the AP 8. In this case, the display apparatus 3 may display imaging modes to allow the user to select an imaging mode.

In step S302, the power control unit 152 determines whether power is supplied from the external interface 141. If the power control unit 152 determines in step S302 that power is supplied not from the external interface 141 but from the battery 142, the process advances to step S303 and subsequent steps. Then, offset correction data (non-exposure image data) is obtained after imaging of the object, and imaging of the object and obtaining of the offset correction data are performed alternately.

In step S303, the radiation source 9 irradiates the radiation imaging apparatus 1 with the radiation 10 through the object 11, and the radiation imaging apparatus 1 obtains a radiation image of an object in a predetermined imaging mode. In step S304, the detection module 110 obtains image data (non-exposure image data) which is obtained in the same imaging mode as in step S303 received in step S301 as offset correction data corresponding to the imaging mode in step S303. In this case, the detection module 110 obtains non-exposure image data in the same imaging mode as in imaging for the radiation image in step S303 as offset correction data.

In step S305, the image processing unit 121 performs offset correction processing by subtracting the offset correction data from the radiation image. In step S306, the image processing unit 121 outputs the correction image having undergone offset correction processing in step S305.

If the power control unit 152 determines in step S302 that power is supplied from the external interface 141, the process advances to step S307 and subsequent steps in which offset correction using offset correction data (non-exposure image data) obtained before imaging of an object is performed. In step S307, the detection module 110 determines whether offset correction data (non-exposure image data) in an imaging mode to be used for imaging in step S309 is stored in the storage unit 122. If no non-exposure image data is stored, the process advances to step S308. If non-exposure image data is stored, the process advances to step S309.

In step S308, the detection module 110 obtains image data (non-exposure image data) which is obtained in the imaging mode in step S309 received in step S301 as offset correction data corresponding to the imaging mode in step S309.

Note that offset correction data to be obtained may generate offset correction data from a plurality of non-exposure image data. For example, a plurality of non-exposure image data are obtained, and the average of the data may be used as offset correction data.

In step S309, the radiation source 9 irradiates the radiation imaging apparatus 1 with the radiation 10 through the object 11, and the radiation imaging apparatus 1 obtains a radiation image of an object in a predetermined imaging mode. The process then advances to steps S305 and S306. Subsequently, the same processing is performed.

As described above, in this embodiment, the first obtaining mode of obtaining offset correction data after imaging of an object for each imaging of the object and the second obtaining mode of obtaining offset correction data obtained in advance before imaging of an object are switched in accordance with the form of power supply to the radiation imaging apparatus. More specifically, the mode of obtaining offset correction data is switched to the first obtaining mode if power is supplied from a battery, and is switched to the second obtaining mode if power is supplied from an external power source.

This makes it possible to implement appropriate offset correction considering the form of power supply to the radiation imaging apparatus. Then, even when the apparatus operates on a limited energy supply source such as a battery, it possible to select optimal offset correction method, satisfy both the requirements for the image quality of obtained images and the possible imaging time and possible number of frames that can be obtained, and improve convenience for the user.

A representative embodiment of the present invention has been described above. However, the present invention is not limited to the embodiment illustrated and described above and changes and modifications can appropriately be made within the spirit and scope of the present invention.

(Second Embodiment)
<Outline>

In the first embodiment, the radiation imaging apparatus that switches modes of obtaining offset correction data in accordance with whether power is fed from the outside or the battery has been described.

In contrast, in the second embodiment, a radiation imaging apparatus that switches modes of obtaining offset correction data in accordance with the operation time during power supplying from a battery in addition to determination of whether power is supplied from the outside will be described. More specifically, the mode of obtaining offset correction data is switched to the first obtaining mode of obtaining offset correction data after imaging of an object for each imaging of the object if power is supplied from the battery, and a predetermined time period has elapsed since an operation by power supply from the battery. The mode of obtaining offset correction data is switched to the second obtaining mode of obtaining offset correction data obtained in advance before imaging of an object if power is supplied from the battery, and the predetermined time period has not elapsed since the operation by power supply from the battery. The arrangement of a radiation imaging apparatus 1 is the same as in the first embodiment, and hence a description of the arrangement will be omitted below.

<Processing>

Figure 4:
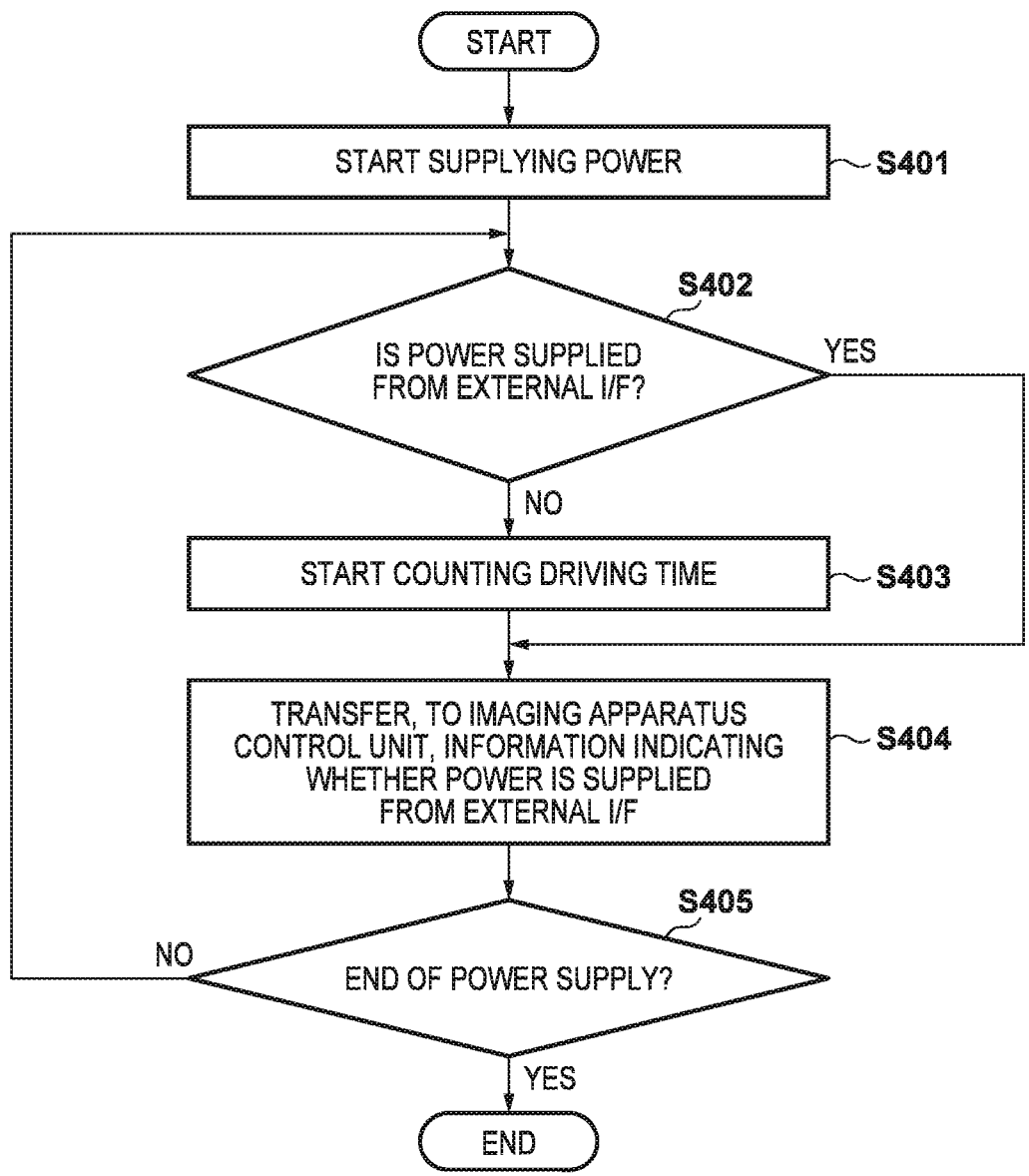
FIG. 4 is a flowchart showing the operation procedure of a power control unit according to the second embodiment.

A procedure for processing of a power control unit 152 at the time of power-on will be described with reference to FIG. 4. FIG. 4 is a flowchart showing an example of the operation of the power control unit 152 according to this embodiment. When an external interface 141 or a battery 142 starts supplying power in step S401, it is determined in step S402 whether power is supplied from the external interface 141. Upon determining in step S402 that power is supplied not from the external interface 141 but from the battery 142, the process advances to step S403. In step S403, the count of the operation time during power supply from the battery 142 is started.

In step S404, information indicating whether power is supplied from the external interface 141 is transferred to an imaging apparatus control unit 151. The process returns to step S402 in which the imaging apparatus control unit 151 periodically determines during the operation of the radiation imaging apparatus 1 whether power is supplied from the external interface 141.

Upon determining in step S402 that power is supplied from the external interface 141, the process advances to step S404 in which the information indicating whether power is supplied from the external interface 141 is transferred to the imaging apparatus control unit 151. Then, it is determined in step S405 whether power supply has ended. If power supply has not ended, the process returns to step S402.

Figure 5:
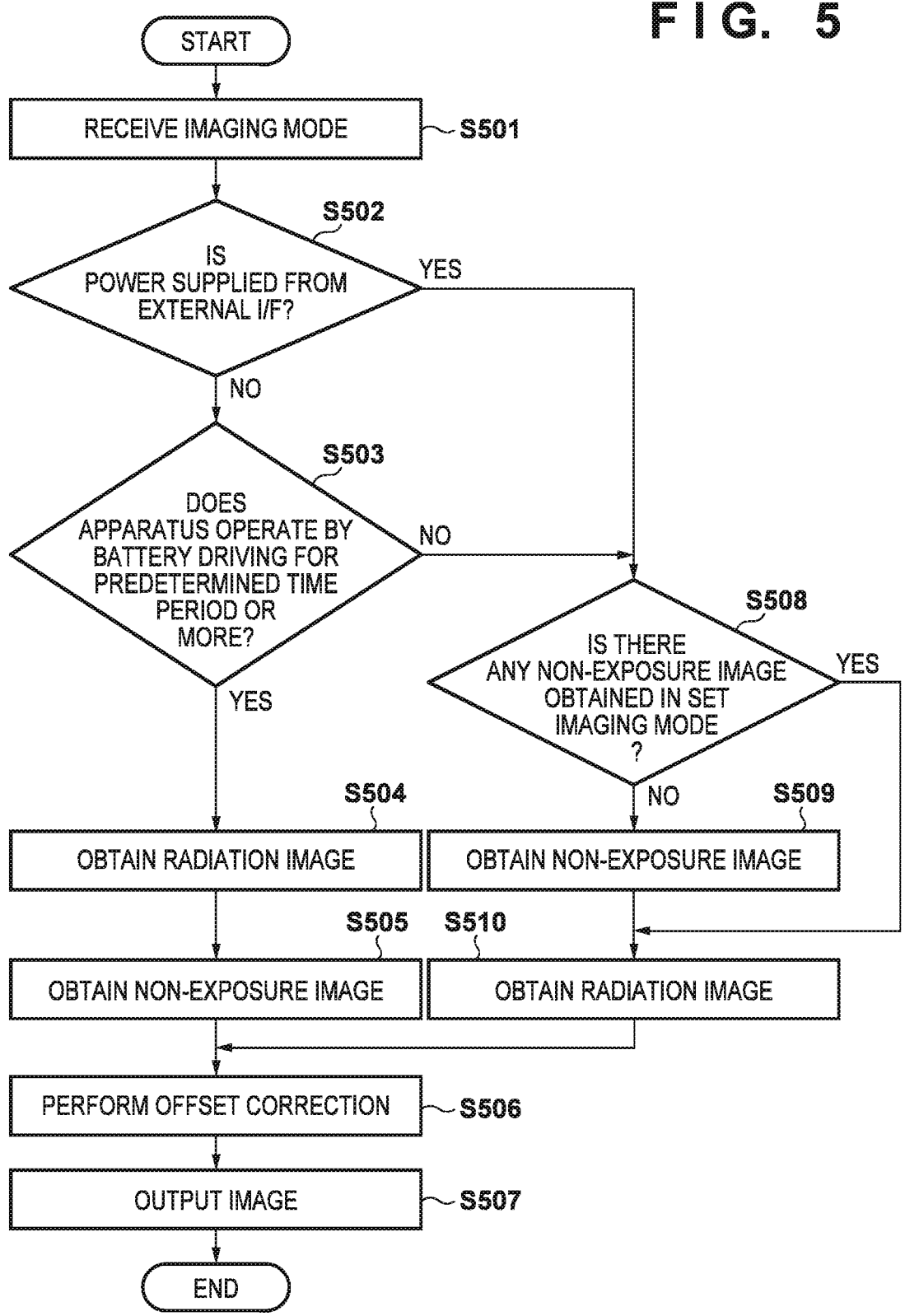
FIG. 5 is a flowchart showing a procedure for image processing according to the second embodiment.

A procedure for image processing including offset correction processing will be described next with reference to FIG. 5. FIG. 5 is a flowchart showing an example of the operation of the radiation imaging apparatus according to this embodiment. In step S501, the user inputs an imaging mode of obtaining a radiation image of an object from an input apparatus 4, and the radiation imaging apparatus 1 receives the imaging mode via a controller 2, a HUB 7, and an AP 8. In this case, a display apparatus 3 may display imaging modes to allow the user to select an imaging mode.

In step S502, the power control unit 152 determines whether power is supplied from the external interface 141. Upon determining in step S502 that power is supplied not from the external interface 141 but from the battery 142, the process advances to step S503.

In step S503, the operation time during power supply from the battery 142 is obtained from the power control unit 152, and if a predetermined time period has elapsed, the process advances to step S504 and subsequent steps. Then, offset correction data (non-exposure image data) is obtained after imaging of an object, and imaging of the object and obtaining of the offset correction data are performed alternately.

In step S504, a radiation source 9 irradiates the radiation imaging apparatus 1 with radiation 10 through an object 11, and the radiation imaging apparatus 1 obtains a radiation image of an object in a predetermined imaging mode. In step S505, a detection module 110 obtains image data (non-exposure image data) which is obtained in the same imaging mode as in step S504 received in step S501 as offset correction data corresponding to the imaging mode in step S504. In this case, the detection module 110 obtains non-exposure image data in the same imaging mode as in imaging for the radiation image in step S504 as offset correction data.

In step S506, an image processing unit 121 performs offset correction processing by subtracting the offset correction data from the radiation image. In step S507, the image processing unit 121 outputs the correction image having undergone offset correction processing in step S506.

Upon determining in step S502 that power is supplied from the external interface 141, the process advances to step S508 and subsequent steps in which offset correction data (non-exposure image data) is obtained before imaging of an object. Furthermore, upon determining in step S503 that the operation time during power supply from the battery 142 is less than the predetermined time period, the process advances to step S508 and subsequent steps as in the above case, in which offset correction using the offset correction data (non-exposure image data) obtained before imaging of the object is performed.

In step S508, the detection module 110 determines whether offset correction data (non-exposure image data) in an imaging mode to be used for imaging in step S510 is stored in a storage unit 122. If no non-exposure image data is stored, the process advances to step S509. If non-exposure image data is stored, the process advances to step S510.

In step S509, the detection module 110 obtains image data (non-exposure image data) which is obtained in the imaging mode in step S510 received in step S501 as offset correction data corresponding to the imaging mode in step S510.

Note that offset correction data to be obtained may generate offset correction data from a plurality of non-exposure image data. For example, a plurality of non-exposure image data are obtained, and the average of the data may be used as offset correction data.

In step S510, the radiation source 9 irradiates the radiation imaging apparatus 1 with the radiation 10 through the object 11, and the radiation imaging apparatus 1 obtains a radiation image of an object in a predetermined imaging mode. The process then advances to steps S506 and S507.

As described above, according to this embodiment, the modes of obtaining offset correction data are switched in accordance with the operation time during power supplying from a battery in addition to determination of whether power is supplied from the outside or the battery. It is therefore possible to implement appropriate offset correction considering the form of power supply to the radiation imaging apparatus.

More specifically, the mode of obtaining offset correction data is switched to the first obtaining mode of obtaining offset correction data after imaging of an object for each imaging of the object if power is supplied from the battery, and a predetermined time period has elapsed since an operation by power supply from the battery. This makes a long-time operation with suppressed battery consumption possible. The mode of obtaining offset correction data is switched to the second obtaining mode of obtaining offset correction data obtained in advance before imaging of an object if power is supplied from a battery, and the predetermined time period has not elapsed since the operation by power supply from the battery. This makes it possible to cope with high frame rate imaging.

This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

(Third Embodiment)
<Outline>

In the second embodiment, the radiation imaging apparatus that switches the modes of obtaining offset correction data in accordance with the operation time during power supplying from a battery in addition to determination of whether power is supplied from the outside has been described.

In contrast, in the third embodiment, a radiation imaging apparatus that switches modes of obtaining offset correction data in accordance with the remaining capacity of a battery in addition to determination of whether power is supplied from the outside will be described. More specifically, the mode of obtaining offset correction data is switched to the first obtaining mode of obtaining offset correction data after imaging of an object for each imaging of the object if power supply from a battery is adopted as a power supply form, and the remaining capacity of the battery is equal to or less than a predetermined amount. The mode of obtaining offset correction data is switched to the second obtaining mode of obtaining offset correction data in advance before imaging of an object if power supply from a battery is adopted as the power supply form, and the remaining capacity of the battery is more than a predetermined amount. The arrangement of a radiation imaging apparatus 1 is the same as in the first embodiment, and hence a description of the arrangement will be omitted below.

<Processing>

Figure 6:
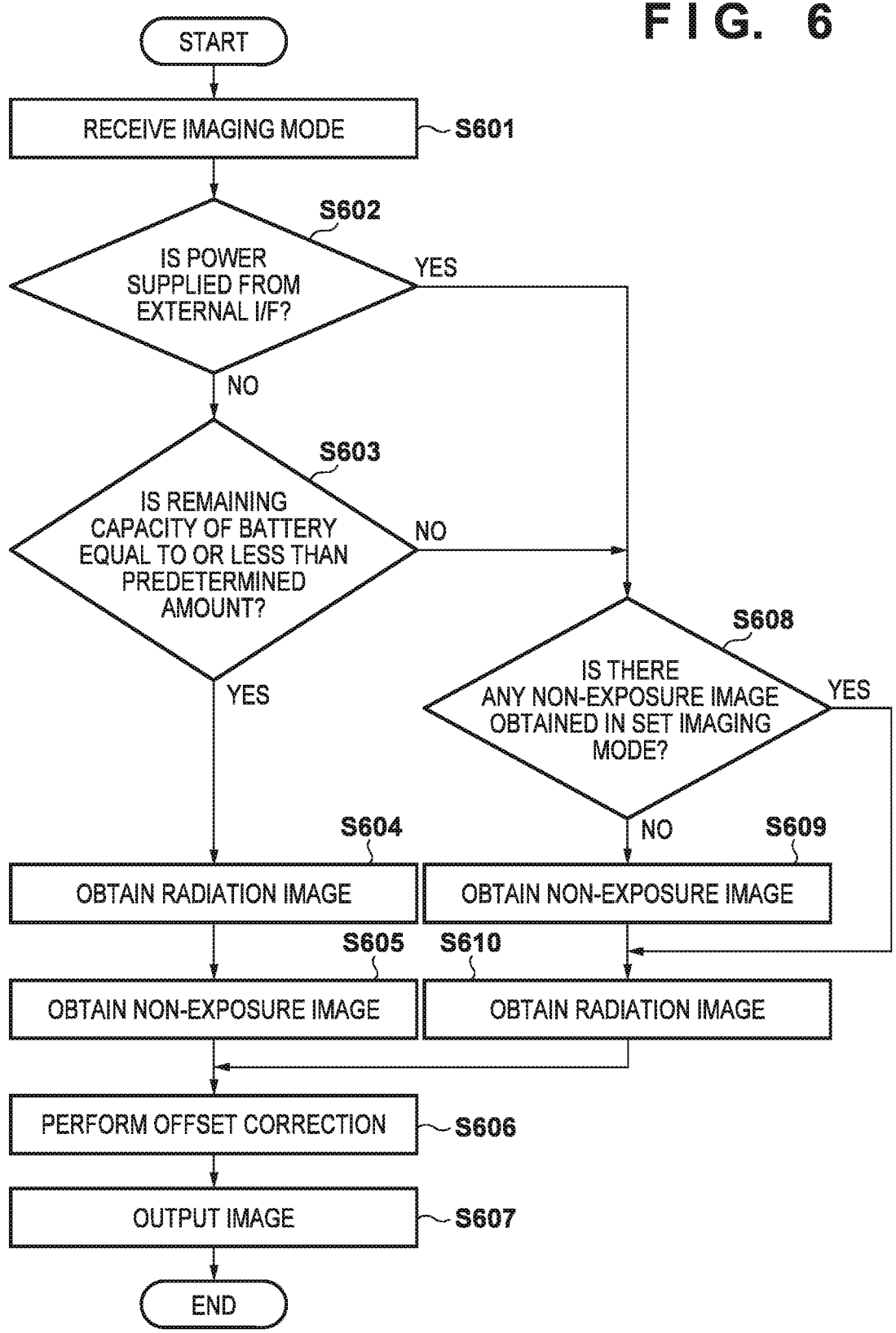
FIG. 6 is a flowchart showing a procedure for image processing according to the third embodiment.

A procedure for image processing including offset correction processing will be described with reference to FIG. 6. FIG. 6 is a flowchart showing an example of the operation of the radiation imaging apparatus according to this embodiment. In step S601, the user inputs an imaging mode of obtaining a radiation image of an object from an input apparatus 4, and the radiation imaging apparatus 1 receives the imaging mode via a controller 2, a HUB 7, and an AP 8. In this case, a display apparatus 3 may display imaging modes to allow the user to select an imaging mode.

In step S602, a power control unit 152 determines whether power is supplied from an external interface 141. Upon determining in step S602 that power is supplied not from the external interface 141 but from a battery 142, the process advances to step S603.

In step S603, the remaining capacity of the battery 142 is obtained from the power control unit 152, and if it is equal to or less than a predetermined amount, the process advances to step S604 and subsequent steps. Then, offset correction data (non-exposure image data) is obtained after imaging of an object, and imaging of the object and obtaining of the offset correction data are performed alternately.

In step S604, a radiation source 9 irradiates the radiation imaging apparatus 1 with radiation 10 through an object 11, and the radiation imaging apparatus 1 obtains a radiation image of an object in a predetermined imaging mode.

In step S605, a detection module 110 obtains image data (non-exposure image data) which is obtained in the same imaging mode as in step S604 received in step S601 as offset correction data corresponding to the imaging mode in step S604. In this case, the detection module 110 obtains non-exposure image data in the same imaging mode as in imaging for the radiation image in step S604 as offset correction data.

In step S606, an image processing unit 121 performs offset correction processing by subtracting the offset correction data from the radiation image. In step S607, the image processing unit 121 outputs the correction image having undergone offset correction processing in step S606.

Upon determining in step S602 that power is supplied from the external interface 141, the process advances to step S608 and subsequent steps in which offset correction data (non-exposure image data) is obtained before imaging of an object. Upon determining in step S603 that the remaining capacity of the battery is more than a predetermined amount, the process advances to step S608 and subsequent steps as in the above case, in which offset correction using the offset correction data (non-exposure image data) obtained before imaging of the object is performed.

In step S608, the detection module 110 determines whether offset correction data (non-exposure image data) in an imaging mode to be used for imaging in step S610 is stored in a storage unit 122. If no non-exposure image data is stored, the process advances to step S609. If non-exposure image data is stored, the process advances to step S610.

In step S609, the detection module 110 obtains image data (non-exposure image data) which is obtained in the imaging mode in step S610 received in step S601 as offset correction data corresponding to the imaging mode in step S610. Note that offset correction data to be obtained may generate offset correction data from a plurality of non-exposure image data. For example, a plurality of non-exposure image data are obtained, and the average of the data may be used as offset correction data.

In step S610, the radiation source 9 irradiates the radiation imaging apparatus 1 with the radiation 10 through the object 11, and the radiation imaging apparatus 1 obtains a radiation image of an object in a predetermined imaging mode. The process then advances to steps S606 and S607.

As described above, according to this embodiment, the modes of obtaining offset correction data are switched in accordance with the remaining capacity of the battery in addition to determination of whether power is supplied from the outside or the battery.

More specifically, the mode of obtaining offset correction data is switched to the first obtaining mode of obtaining offset correction data after imaging of an object for each imaging of the object if power supply from a battery is adopted as a power supply form, and the remaining capacity of the battery is equal to or less than a predetermined amount. This makes a long-time operation with suppressed battery consumption possible. The mode of obtaining offset correction data is switched to the second obtaining mode of obtaining offset correction data obtained in advance before imaging of an object if power supply from a battery is adopted as the power supply form, and the remaining capacity of the battery is more than the predetermined amount. This makes it possible to cope with high frame rate imaging.

This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

(Fourth Embodiment)
<Outline>

In the third embodiment, the radiation imaging apparatus that switches the modes of obtaining offset correction data in accordance with the remaining capacity of the battery in addition to determination of whether power is supplied from the outside has been described.

In contrast, in the fourth embodiment, a radiation imaging apparatus that switches modes of obtaining offset correction data in accordance with the requested number of frames in addition to determining of whether power is supplied from the outside.

In this case, the requested number of frames means the number of frames determined before imaging. Imaging with the number of frames determined in advance includes, for example, angiography in tomosynthesis and imaging in DSA (Digital Subtraction Angiography).

More specifically, the mode of obtaining offset correction data is switched to the first obtaining mode of obtaining offset correction data after imaging of an object for each imaging of the object if power supply from a battery is adopted as a power supply form, and the requested number of frames is equal to or more than a predetermined number. The mode of obtaining offset correction data is switched to the second obtaining mode of obtaining offset correction data obtained in advance before imaging of an object if power supply from the battery is used as the power supply form, and the requested number of frames is less than the predetermined number. The arrangement of a radiation imaging apparatus 1 is the same as in the first embodiment, and hence a description of the arrangement will be omitted below.

<Processing>

Figure 7:
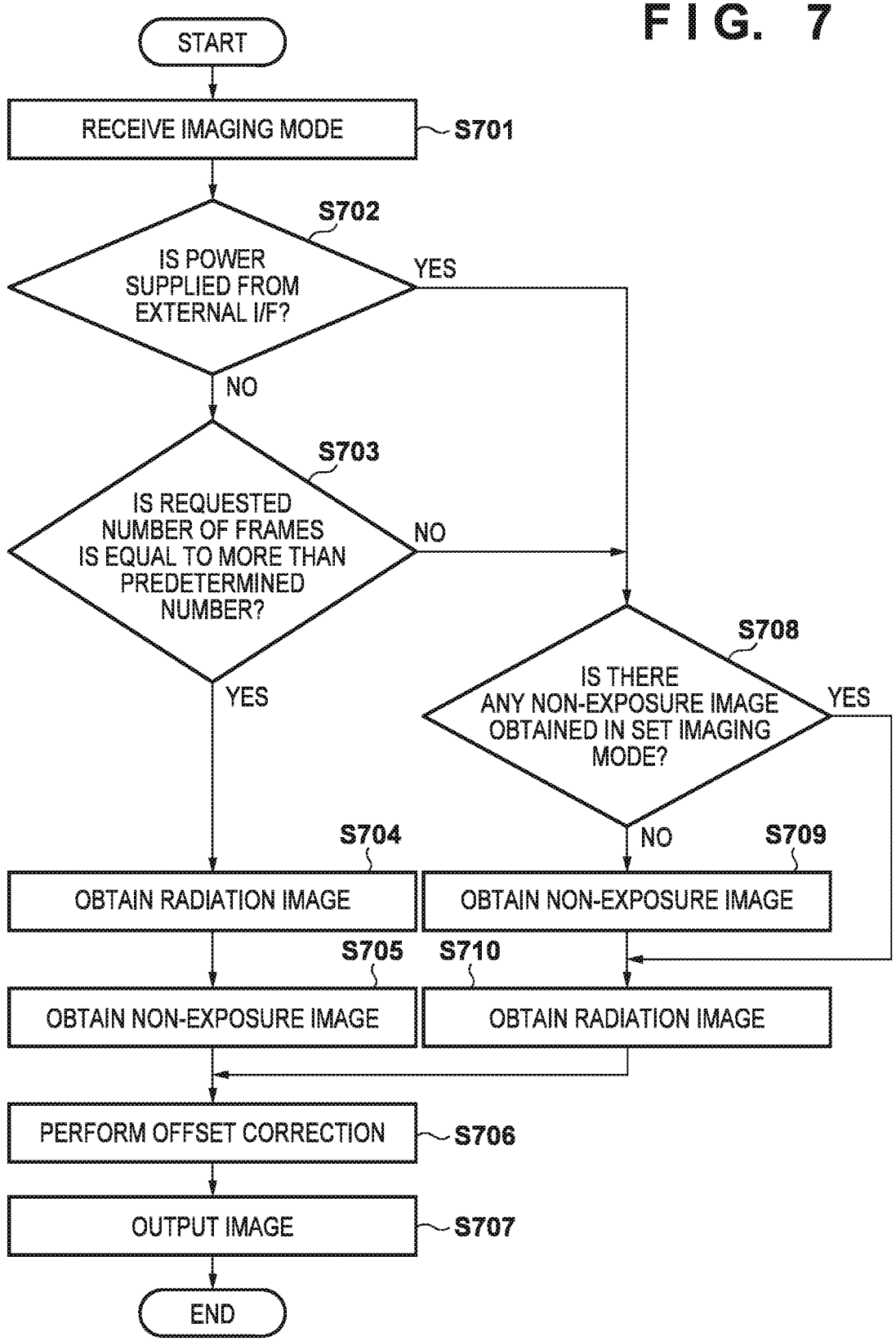
FIG. 7 is a flowchart showing a procedure for image processing according to the fourth embodiment.

A procedure for image processing including offset correction processing will be described with reference to FIG. 7. FIG. 7 is a flowchart showing an example of the operation of the radiation imaging apparatus according to this embodiment. In step S701, the user inputs an imaging mode of obtaining a radiation image of an object from an input apparatus 4, and the radiation imaging apparatus 1 receives the imaging mode via a controller 2, a HUB 7, and an AP 8.

In this case, a display apparatus 3 may display imaging modes to allow the user to select an imaging mode.

In step S702, a power control unit 152 determines whether power is supplied from an external interface 141. Upon determining in step S702 that power is supplied not from the external interface 141 but from a battery 142, the process advances to step S703.

In step S703, it is determined whether the requested number of frames included in the imaging mode received in step S701 is equal to or more than a predetermined number. If the requested number of frames is equal to or more than the predetermined number, the process advances to step S704 and subsequent steps in which offset correction data (non-exposure image data) is obtained after imaging of an object, and imaging of the object and obtaining of the offset correction data are performed alternately. In step S704, a radiation source 9 irradiates the radiation imaging apparatus 1 with radiation 10 through an object 11, and the radiation imaging apparatus 1 obtains a radiation image of an object in a predetermined imaging mode.

In step S705, a detection module 110 obtains image data (non-exposure image data) which is obtained in the same imaging mode as in step S704 received in step S701 as offset correction data corresponding to the imaging mode in step S704. In this case, the detection module 110 obtains non-exposure image data in the same imaging mode as in imaging for the radiation image in step S704 as offset correction data.

In step S706, an image processing unit 121 performs offset correction processing by subtracting the offset correction data from the radiation image. In step S707, the image processing unit 121 outputs the correction image having undergone offset correction processing in step S706.

Upon determining in step S702 that power is supplied from the external interface 141, the process advances to step S708 and subsequent steps in which offset correction data (non-exposure image data) is obtained before imaging of an object. In addition, upon determining in step S703 that the requested number of frames included in the imaging mode received in step S701 is less than the predetermined number, the process advances to step S708 and subsequent steps as in the above case, in which offset correction is performed by using the offset correction data (non-exposure image data) obtained before imaging of the object.

In step S708, the detection module 110 determines whether offset correction data (non-exposure image data) in an imaging mode to be used for imaging in step S710 is stored in a storage unit 122. If no non-exposure image data is stored, the process advances to step S709. If non-exposure image data is stored, the process advances to step S710.

In step S709, the detection module 110 obtains image data (non-exposure image data) which is obtained in the imaging mode in step S710 received in step S701 as offset correction data corresponding to the imaging mode in step S710. Note that offset correction data to be obtained may generate offset correction data from a plurality of non-exposure image data. For example, a plurality of non-exposure image data are obtained, and the average of the data may be used as offset correction data.

In step S710, the radiation source 9 irradiates the radiation imaging apparatus 1 with the radiation 10 through the object 11, and the radiation imaging apparatus 1 obtains a radiation image of an object in a predetermined imaging mode. The process then advances to steps S706 and S707.

As described above, according to this embodiment, the modes of obtaining offset correction data are switched in accordance with the requested number of frames in addition to determination of whether power is supplied from the outside or the battery.

More specifically, the mode of obtaining offset correction data is switched to the first obtaining mode of obtaining offset correction data after imaging of an object for each imaging of the object if power supply from a battery is adopted as a power supply form, and the requested number of frames is equal to or more than the predetermined number. This makes a long-time operate with suppressed battery consumption and obtaining of the needed number of frames possible. The mode of obtaining offset correction data is switched to the second obtaining mode of obtaining offset correction data obtained in advance before imaging of an object if power supply from a battery is adopted as the power supply form, and the requested number of frames is less than the predetermined number. This makes it possible to cope with high frame rate imaging.

This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

Note that in the second to fourth embodiments, examples in which the second determination steps (steps S503, S603, and S703) are provided in addition to determination of whether power is supplied from the outside have been described. However, the modes of obtaining offset correction data may be switched by using the combined second determination steps in the respective embodiments as the second determination step.

According to the first to fourth embodiments of the present invention, it is possible to implement appropriate offset correction considering the form of power supply to the radiation imaging apparatus.

(Fifth Embodiment)

Figure 8:
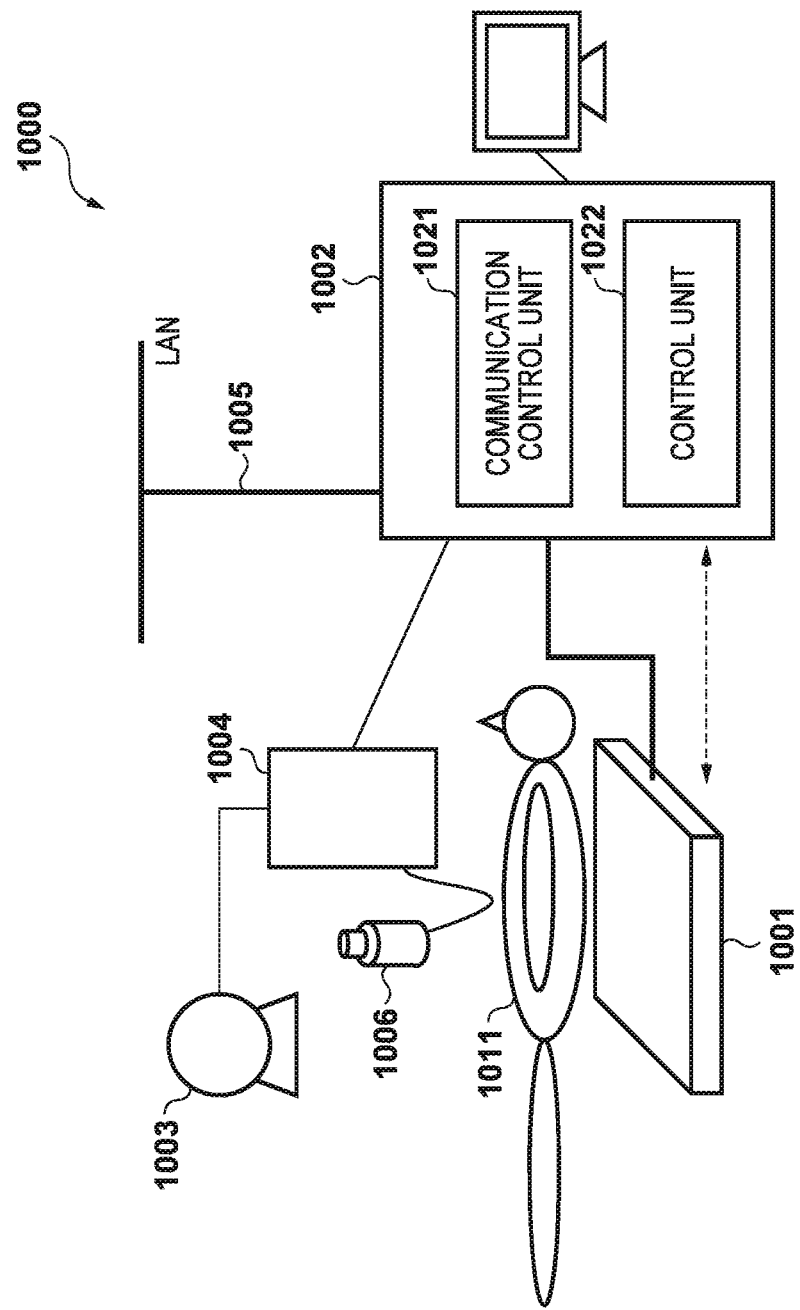
FIG. 8 is a block diagram showing an example of the arrangement of a radiation imaging system including a radiation imaging apparatus according to the fifth embodiment of the present invention.

FIG. 8 is a block diagram showing an example of the arrangement of a radiation imaging system 1000 including a radiation imaging apparatus. The arrangement of the radiation imaging system 1000 is used when, for example, a radiation image is obtained in a hospital. As shown in FIG. 8, the radiation imaging system 1000 includes a radiation imaging apparatus 1001, a controller 1002 (external apparatus), a radiation source 1003, a radiation generation apparatus 1004, a LAN 1005 (network), and an irradiation switch 1006.

The radiation imaging apparatus 1001 detects radiation transmitted through an object 1011 and forms a radiation image. The controller 1002 (external apparatus) can control the operation of the radiation imaging apparatus 1001 and performs, for example, the setting of imaging conditions, operation control, and the like on the radiation imaging apparatus 1001. For example, the radiation imaging apparatus 1001 transfers an image, transmits a reached dose, transmits an automatic exposure control signal, and the like to the controller 1002. The controller 1002 includes, for example, a mouse and a keyboard as input devices (input units) for enabling the setting of the imaging conditions, the operation control, and the input/output of information such as image information and includes, for example, a display or the like as an output device (output unit). In addition, the controller 1002 performs, for example, control of irradiation with radiation on the radiation generation apparatus 1004. The radiation source 1003 includes, for example, a rotor and an X-ray tube for accelerating electrons at a high voltage and colliding them against an anode in order to generate radiation (here, the radiation is, for example, X-rays). The irradiation switch 1006 requests exposure to the controller 1002 when it is turned on by an operator.

The controller 1002 includes, as the functional arrangement, a communication control unit 1021 that controls communication with the radiation imaging apparatus 1001 and a control unit 1022 that performs the operation control, setting of the imaging conditions, dose control, and the like of the radiation imaging apparatus 1001. The controller 1002 monitors the states of the radiation imaging apparatus 1001 and the radiation generation apparatus 1004, and controls irradiation with radiation and imaging. The object is irradiated with radiation emitted from the radiation source 1003. The radiation imaging apparatus 1001 detects the radiation transmitted through the object and forms an image. A circuit for mediating communication of the controller 1002 may hold another unit outside the controller 1002 as the communication control unit 1021.

Figure 9:
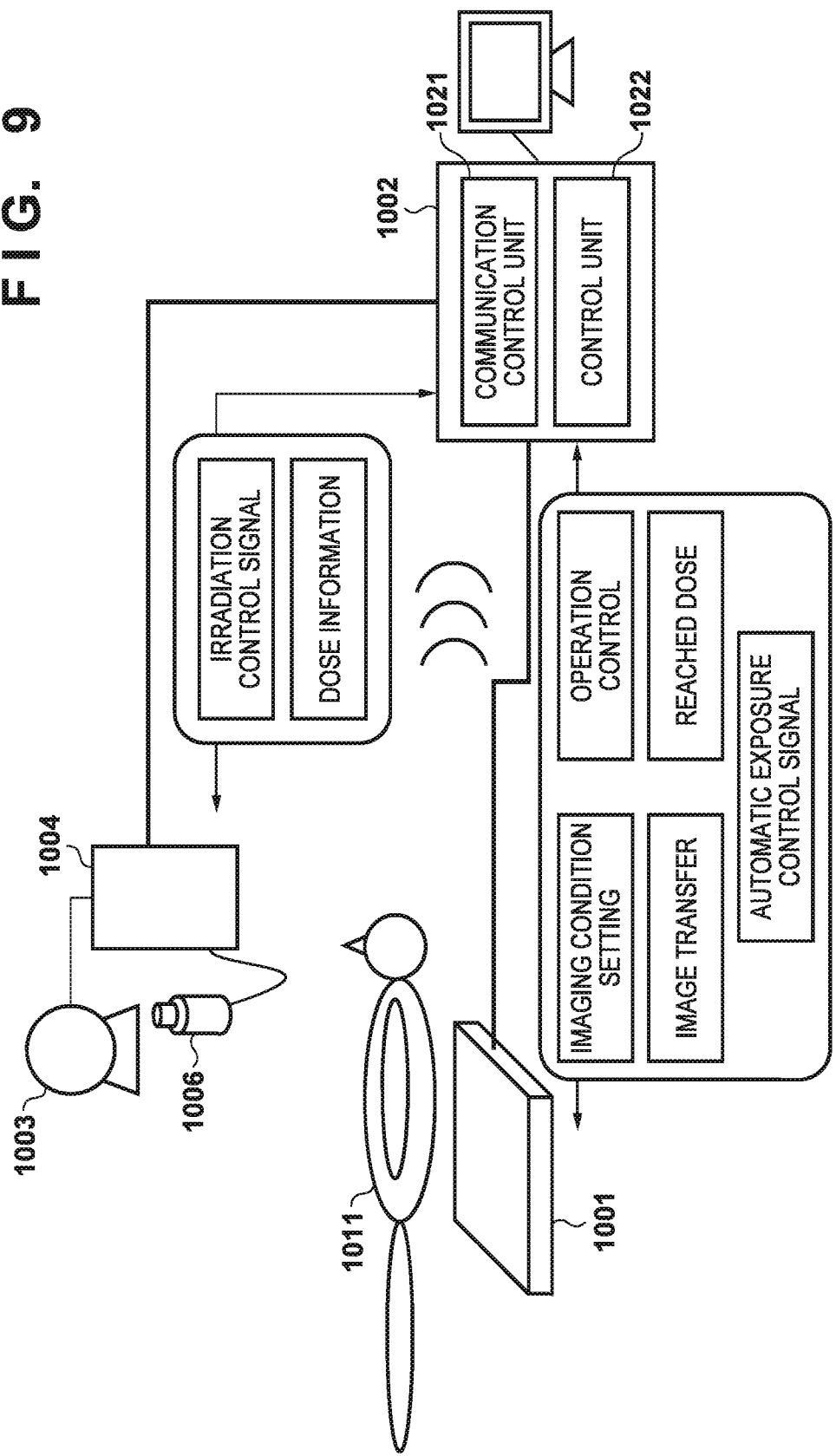
FIG. 9 is a block diagram showing an example of data exchange of a controller in the radiation imaging system according to the fifth embodiment of the present invention.

FIG. 9 is a block diagram exemplifying data transmission/reception in the controller 1002 in the radiation imaging system. FIG. 9 shows an example of data exchange between the controller 1002 and the radiation imaging apparatus 1001, and the controller 1002 and the radiation generation apparatus 1004. The controller 1002 exchanges the setting of imaging conditions, operation control, image transfer, a reached dose, an automatic exposure control signal, and the like with the radiation imaging apparatus 1001, and communicates dose information and information on an irradiation control signal or the like with the radiation generation apparatus 1004. The radiation imaging apparatus 1001 includes two communication units of a wireless communication unit and a wired communication unit, and can be connected to the communication control unit 1021 of the controller 1002 by using the two communication units.

Note that the dose information is an irradiation dose from the radiation source 1003, and the reached dose indicates a dose that reaches the radiation imaging apparatus 1001 out of irradiation doses from the radiation source 1003. The automatic exposure control signal is a signal that includes two signals of, for example, an irradiation stop signal and a non-irradiation stop signal. The wired communication unit is a path for information transmission and makes information exchange possible by, for example, connecting a cable using a communication standard with a predetermined agreement, or a standard such as RS232C, USB, or Ethernet®.

The wireless communication unit is a path for information transmission as the wired communication unit and formed by, for example, a circuit board including a communication IC or the like. The wireless communication unit is electrically connected to an antenna (not shown) capable of transmitting/receiving a radio wave. The circuit board including the communication IC or the like performs communication processing of a protocol based on a wireless LAN via the antenna. Note that the frequency band, standard, or method of wireless communication in wireless communication is not particularly limited, and near field wireless communication such as NFC or Bluetooth, or a method such as UWB (Ultra Wide Band) may be used. Alternatively, the wireless communication unit may have a plurality of wireless communication methods and perform communication by selecting among them appropriately.

Figure 10:
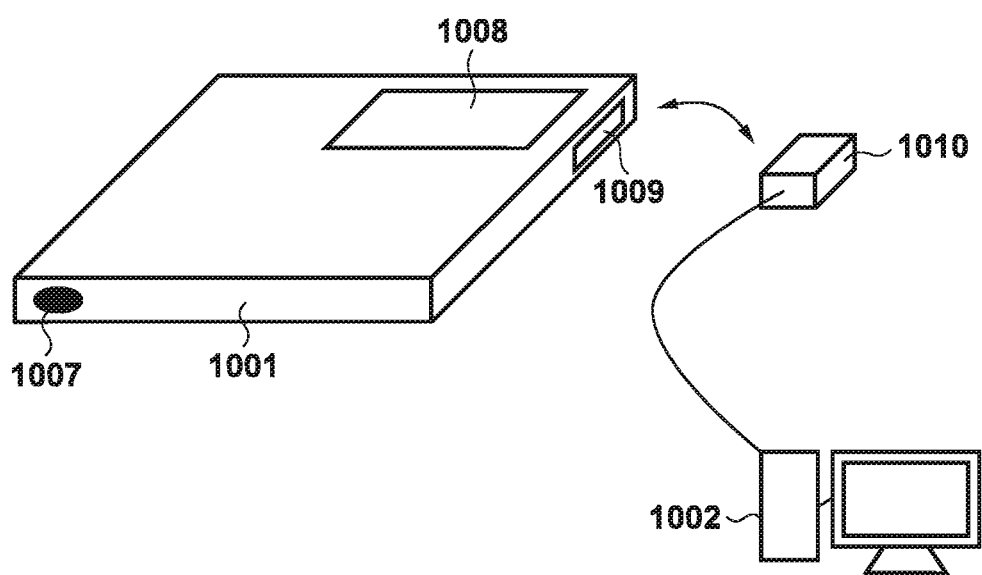
FIG. 10 is a view showing an example of the outer shape of the radiation imaging apparatus according to the fifth embodiment of the present invention.

The radiation imaging apparatus 1001 is, for example, a portable cassette-type flat panel detector. FIG. 10 is a view showing an example of the outer shape of the portable radiation imaging apparatus 1001. The radiation imaging apparatus 1001 includes a power button 1007 configured to power on or off the apparatus, a battery unit 1008 (power supply unit) that supplies operation power, and a connector connection unit 1009. The battery unit 1008 is arranged detachably, and a battery body is charged by a battery charger. The radiation imaging apparatus 1001 is driven based on the operation power supplied by the battery unit 1008. The radiation imaging apparatus 1001 can be connected to the controller 1002 by using a sensor cable 1010. The radiation imaging apparatus 1001 can be connected to the sensor cable 1010 via the connector connection unit 1009. When the sensor cable 1010 connects the radiation imaging apparatus 1001 and the controller 1002, connecting portions of the two are automatically switched to be in wired communication, and information is exchanged by wired communication between the radiation imaging apparatus 1001 and the controller 1002 illustrated in FIG. 9. Alternatively, regardless of a connection form, the controller 1002 may be able to switch communication units by a user operation.

Figure 11:
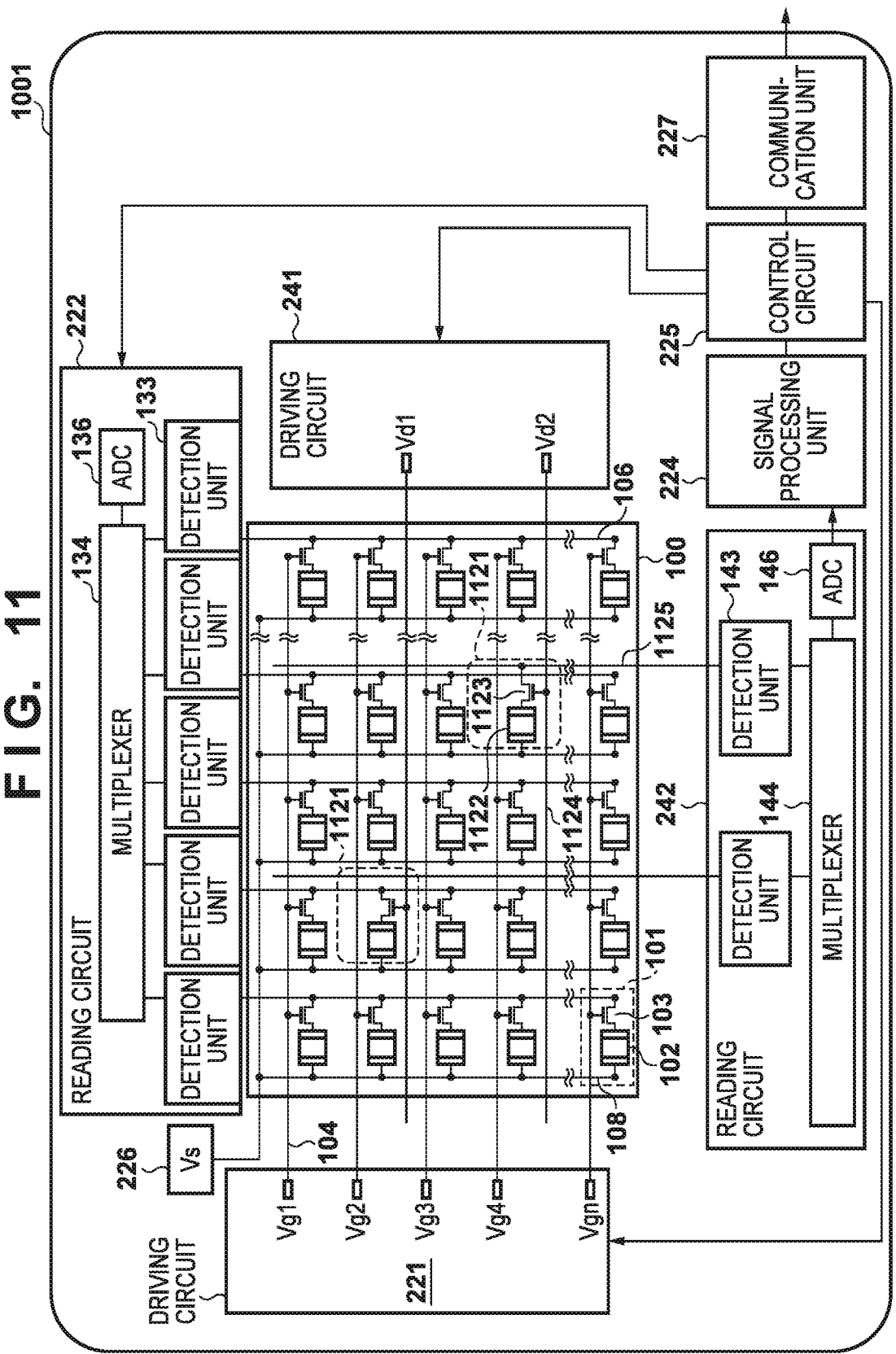
FIG. 11 is a circuit diagram showing an example of the internal arrangement of the radiation imaging apparatus according to the fifth embodiment of the present invention.

FIG. 11 is a circuit diagram exemplifying the internal arrangement of the radiation imaging apparatus 1001 that functions as an imaging unit for obtaining a radiation image of an object. The radiation imaging apparatus 1001 includes a plurality of pixels arrayed in an imaging region 100 so as to form a plurality of rows and a plurality of columns. The plurality of pixels include a plurality of imaging pixels 101 for obtaining a radiation image and detection pixels 1121 for detecting radiation. Each imaging pixel 101 includes a first conversion element 102 that converts radiation into an electric signal, and a first switch 103 arranged between a column signal line 106 and the first conversion element 102. Each detection pixel 1121 includes a second conversion element 1122 that converts radiation into an electric signal, and a second switch 1123 arranged between a detection signal line 1125 and the second conversion element 1122.

The first conversion elements 102 and the second conversion elements 1122 are formed by a scintillator that converts radiation into light and photoelectric conversion elements that convert light into electric signals. The scintillator can generally be formed into a sheet-like shape so as to cover the imaging region 100 and shared by the plurality of pixels. Alternatively, the first conversion elements 102 and the second conversion elements 1122 can be formed by conversion elements that convert radiation into light directly.

The first switches 103 and the second switches 1123 can include, for example, TFTs (Thin Film Transistors) with active regions each formed by a semiconductor such as amorphous silicon or polysilicon (preferably polysilicon).

The radiation imaging apparatus 1001 includes the plurality of column signal lines 106 and a plurality of driving lines 104. Each column signal line 106 corresponds to one of the plurality of columns in the imaging region 100. Each driving line 104 corresponds to one of the plurality of rows in the imaging region 100. Each driving line 104 is driven by a row selecting unit 221.

The first electrode of each first conversion element 102 is connected to the first main electrode of a corresponding one of the first switches 103, and the second electrode of each first conversion element 102 is connected to a corresponding one of bias lines 108. Note that one bias line 108 extends in a column direction and is commonly connected to the second electrodes of the plurality of conversion elements 102 arrayed in the column direction. The bias lines 108 receive a bias voltage Vs from a power supply circuit 226. The second main electrodes of the first switches 103 in the plurality of imaging pixels 101 that form one column are connected to one column signal line 106. The control electrodes of the first switches 103 in the plurality of imaging pixels 101 that form one row are connected to one driving line 104.

The plurality of column signal lines 106 are connected to a reading circuit 222. Note that the reading circuit 222 can include a plurality of detection units 133, a multiplexer 134, and an analog/digital converter (to be referred to as an A/D converter (ADC) hereinafter) 136. Each of the plurality of column signal lines 106 is connected to the corresponding detection unit 133 out of the plurality of detection units 133 in the reading circuit 222. Note that one column signal line 106 corresponds to one detection unit 133. The detection units 133 include, for example, differential amplifiers. The multiplexer 134 selects the plurality of detection units 133 in a predetermined order and supplies a signal from the selected detection unit 133 to the A/D converter 136. The A/D converter 136 converts the supplied signal into a digital signal and outputs the converted signal.

The first electrodes of the second conversion elements 1122 are connected to the first main electrodes of the second switches 1123, and the second electrodes of the second conversion elements 1122 are connected to the bias lines 108. The second main electrodes of the second switches 1123 are electrically connected to the detection signal lines 1125. The control electrodes of the second switches 1123 are electrically connected to driving lines 1124. The radiation imaging apparatus 1001 can include the plurality of detection signal lines 1125. One or the plurality of detection pixels 1121 can be connected to one detection signal line 1125. The driving lines 1124 are driven by a driving circuit 241. One or the plurality of detection pixels 1121 can be connected to one driving line 1124.

The detection signal lines 1125 are connected to a reading circuit 242. Note that the reading circuit 242 can include a plurality of detection units 143, a multiplexer 144, and an A/D converter 146. Each of the plurality of detection signal lines 1125 can be connected to the corresponding detection unit 143 out of the plurality of detection units 143 in the reading circuit 242. Note that one detection signal line 1125 corresponds to one detection unit 143. The detection units 143 include, for example, differential amplifiers. The multiplexer 144 selects the plurality of detection units 143 in a predetermined order and supplies a signal from the selected detection unit 143 to the A/D converter 146. The A/D converter 146 converts the supplied signal into a digital signal and outputs the converted signal.

The output of the reading circuit 242 (A/D converter 146) is supplied to a signal processing unit 224 and processed by the signal processing unit 224. Based on the output of the reading circuit 242 (A/D converter 146), the signal processing unit 224 outputs information indicating irradiation with radiation for the radiation imaging apparatus 1001. More specifically, for example, the signal processing unit 224 detects irradiation with radiation for the radiation imaging apparatus 1001, or calculates the irradiation amount and/or accumulated irradiation amount of radiation. Based on information from the signal processing unit 224, a control circuit 225 controls the row selecting unit 221, the driving circuit 241, and the reading circuit 242. Based on information from the signal processing unit 224, the control circuit 225 controls, for example, the start and end of exposure (accumulation of charge corresponding to radiation emitted by the imaging pixels 101). The radiation imaging apparatus 1001 also holds a communication unit 227 that communicates with the controller 1002. The communication unit 227 includes two communication units of a wired communication unit and a wireless communication unit.

A detailed operation of the radiation imaging system in this embodiment will be described next with reference to FIG. 12. In the fifth embodiment, an arrangement that switches, based on determination of the transfer load (for example, the transfer count of images, the data size of a transferred image, or the like) of the communication unit 227 that transfers an image from the radiation imaging apparatus 1001 (radiation imaging unit) to the controller 1002 (external apparatus), offset correction that corrects an offset component appearing in a radiation image to offset correction by the first offset correction unit of the radiation imaging apparatus 1001 or the second offset correction unit of the controller 1002 (external apparatus) will be described.

As an offset correction method, there is, for example, a method (to be referred to as "fixed dark current" or "fixed dark correction" hereinafter) of performing offset correction processing by subtracting, as a correction image, image data obtained without irradiation with radiation before imaging for a radiation image of an object from the radiation image of the object. There is also a method (to be referred to as "intermittent dark current" or "intermittent dark correction" hereinafter) of performing offset correction processing by alternately obtaining a radiation image of an object and obtaining image data (correction image) without irradiation with radiation, and subtracting each correction image from a corresponding radiation image.

In fixed dark correction, because offset correction data is obtained before imaging for a radiation image of an object, the frame rate is high, and high-speed continuous imaging such as moving-image capturing can be performed. The dark current charge accumulated during imaging changes due to the influences of the temperature of a radiation detector, imaging conditions, and the like. For this reason, when offset correction data is obtained before imaging for a radiation image of an object as in a fixed dark correction method, the accuracy of offset correction may be influenced by the accumulated dark current charge.

In intermittent dark correction, because obtaining of a radiation image of an object and obtaining of a correction image are performed alternately, the influence of dark current charge can be reduced as compared with fixed dark correction. When an external apparatus performs intermittent dark correction, correction images are transferred to the external apparatus more frequently as compared with a case in which fixed dark correction is performed. Therefore, as compared with fixed dark correction, intermittent dark correction needs higher power consumption in order to transfer the correction images.

Figure 12:
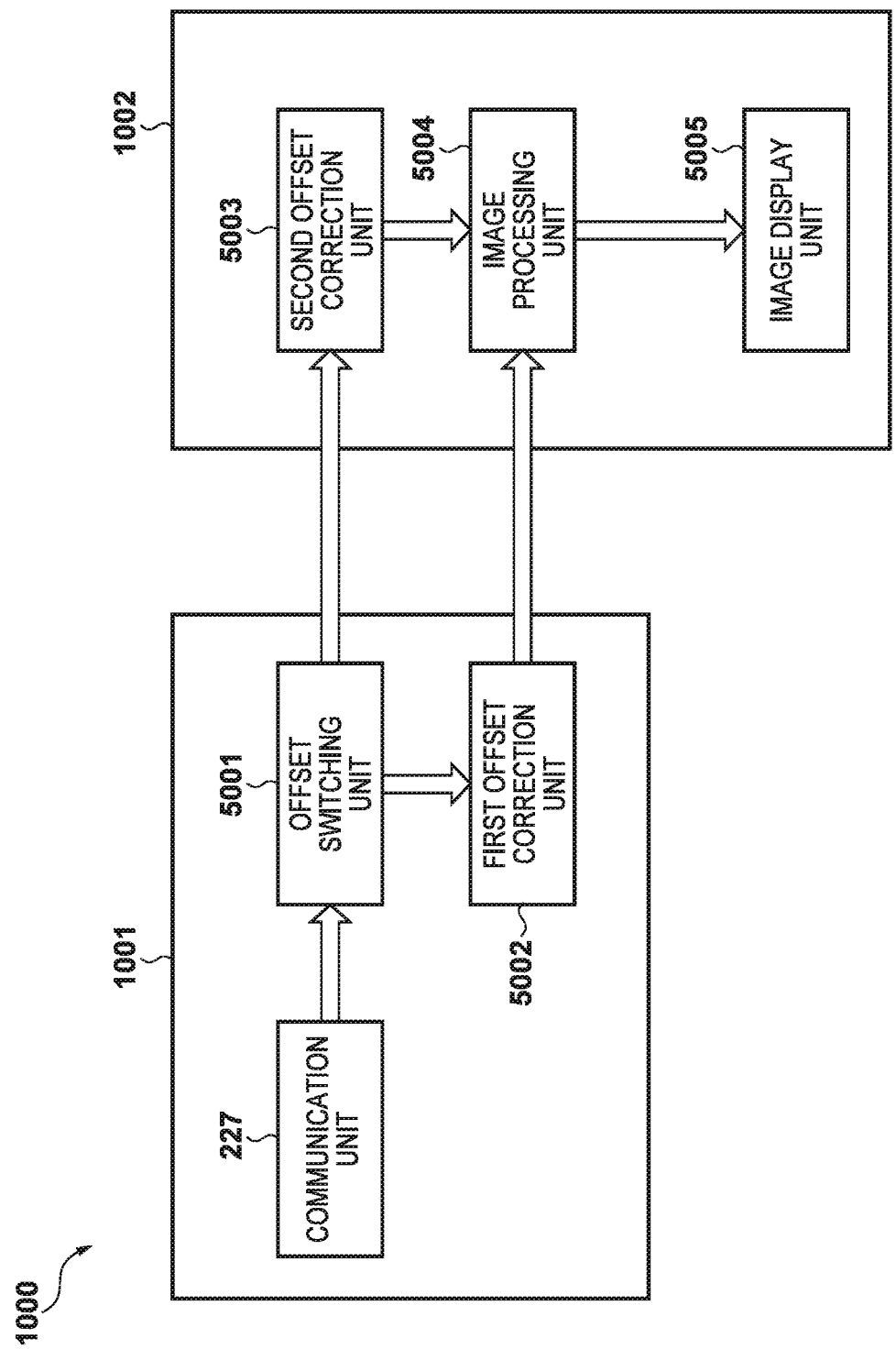
FIG. 12 is a block diagram showing the arrangement of the radiation imaging apparatus according to the fifth embodiment.

As shown in FIG. 12, the radiation imaging apparatus 1001 includes the communication unit 227 that transfers image data from the control circuit 225 described in FIG. 11 and an offset switching unit 5001 that switches the offset correction units that perform offset correction of image data. The offset switching unit 5001 is connected to a first offset correction unit 5002 that stores an offset image and performs offset correction (first offset correction) in the radiation imaging apparatus 1001, and a second offset correction unit 5003 that performs offset correction (second offset correction) in the controller 1002.

The communication unit 227 transfers an image from the radiation imaging apparatus 1001 (radiation imaging unit) to the controller 1002 (external apparatus) and functions as a determination unit that determines the transfer load of the communication unit 227 based on an operation setting for the radiation imaging apparatus 1001.

Based on determination of the transfer load of the communication unit 227 (determination unit), the offset switching unit 5001 switches offset correction for a radiation image to offset correction by the first offset correction unit 5002 of the radiation imaging apparatus 1001 or the second offset correction unit 5003 of the controller 1002 (external apparatus). The offset switching unit 5001 switches offset correction for the radiation image to offset correction by the first offset correction unit 5002 if the transfer load is set to be equal to or more than a reference load, or to offset correction by the second offset correction unit 5003 if the transfer load is set not to exceed the reference load.

If the first offset correction (for example, intermittent dark correction) is set as the operation setting of the radiation imaging apparatus 1001, which performs offset correction processing by alternately obtaining a radiation image and obtaining image data (correction image) without irradiation with radiation, and subtracting each correction image from a corresponding radiation image, the communication unit 227 (determination unit) determines that the transfer load is set to be equal to or more than a reference load. In this case, the offset switching unit 5001 switches offset correction for the radiation image to offset correction by the first offset correction unit 5002.

Based on determination of the communication unit 227 (determination unit), if the first offset correction (for example, intermittent dark correction) is set as offset correction for the radiation image, the offset switching unit 5001 outputs a radiation image of an object obtained by the radiation imaging apparatus 1001 to the first offset correction unit 5002. The offset switching unit 5001 also outputs, to the first offset correction unit 5002, a correction image (first dark image) obtained by the radiation imaging apparatus 1001 on the same condition as imaging for a radiation image without irradiation with radiation after imaging of the radiation image.

The first offset correction unit 5002 outputs, to the controller 1002 as the external apparatus, an offset image having undergone the first offset correction by subtracting a correction image (first dark image) obtained for each imaging from an obtained radiation image of the object.

In intermittent dark correction, the first offset correction unit 5002 performs driving highly correlated with radiation imaging after the end of radiation imaging and obtains a correction image without irradiation with radiation. That is, the first offset correction unit 5002 drives the radiation imaging apparatus 1001 on the same condition as radiation imaging after the end of radiation imaging and obtains the correction image without irradiation with radiation. The obtained correction image is called an intermittent dark image (first dark image) and by this intermittent dark image, the first offset correction unit 5002 corrects an offset component appearing in a radiation image (first offset correction). Correction processing for an offset component is performed by subtracting a correction image from a radiation image. Intermittent dark correction can accurately correct an artifact owing to a change in characteristics of a sensor unit by, for example, the temperature of the radiation imaging apparatus 1001 and is a correction method effective at the time of portable imaging in which an environment such as room temperature is likely to change greatly.

For intermittent offset correction, because an offset image is obtained for each radiation imaging, the first offset correction unit 5002 performs correction in the radiation imaging apparatus 1001, and then transfers an image to the controller 1002. This makes it possible to nearly halve a transfer data amount and reduce the load of a transmission path.

If the second offset correction (for example, fixed dark correction) that performs offset correction processing is set as the operation setting of the radiation imaging apparatus 1001 by subtracting, as a correction image, image data obtained without irradiation with radiation before imaging for a radiation image of an object from the radiation image, the communication unit 227 (determination unit) determines that the transfer load is set not to exceed the reference load. In this case, the offset switching unit 5001 switches offset correction for the radiation image to offset correction by the second offset correction unit 5003.

Based on determination of the communication unit 227 (determination unit), if the second offset correction (for example, fixed dark correction) is set as offset correction for the radiation image, the offset switching unit 5001 outputs, to the second offset correction unit 5003, a correction image (second dark image) obtained by the radiation imaging apparatus 1001 without irradiation with radiation at a timing before imaging for a radiation image. The offset switching unit 5001 also outputs a radiation image of an object obtained by the radiation imaging apparatus 1001 to the second offset correction unit 5003. The second offset correction unit 5003 outputs an offset image having undergone the second offset correction (for example, fixed dark correction) by subtracting a correction image (second dark image) obtained in advance from an obtained radiation image of the object.

In fixed dark correction, the second offset correction unit 5003 obtains a correction image without irradiation with radiation at a timing irrelevant to radiation imaging. The second offset correction unit 5003 stores the obtained correction image. This correction image is called a fixed dark image (second dark image) and by this fixed dark image, the second offset correction unit 5003 corrects an offset component appearing in a radiation image (second offset correction). Correction processing for an offset component is performed by subtracting a correction image from a radiation image.

In fixed dark correction, because a dark image is obtained at the timing irrelevant to radiation imaging, it is advantageous to be able to obtain a plurality of dark images and reduce the influence of a random noise component, and a display time from imaging for a radiation image, a cycle time of radiation imaging, and the like can be reduced.

For fixed dark correction, it is necessary to periodically obtain a correction image. This requires high power consumption for operations other than an imaging operation. Therefore, fixed dark correction can be performed by the controller 1002 having a high processing capability and capable of performing processing without receiving any influence of battery power consumption. Then, higher processing efficiency is obtained by storing a result in the second offset correction unit 5003 in the controller 1002 as compared with a case in which the result is returned to the radiation imaging apparatus 1001. Thus, the second offset correction unit 5003 can be arranged in the controller 1002.

The controller 1002 includes an image processing unit 5004 that performs image processing on image data. The first offset correction unit 5002 and the second offset correction unit 5003 are connected to the image processing unit 5004. An image display unit 5005 is connected to the image processing unit 5004 and displays the image data having undergone image processing by the image processing unit 5004 to an operator.

Figure 13:
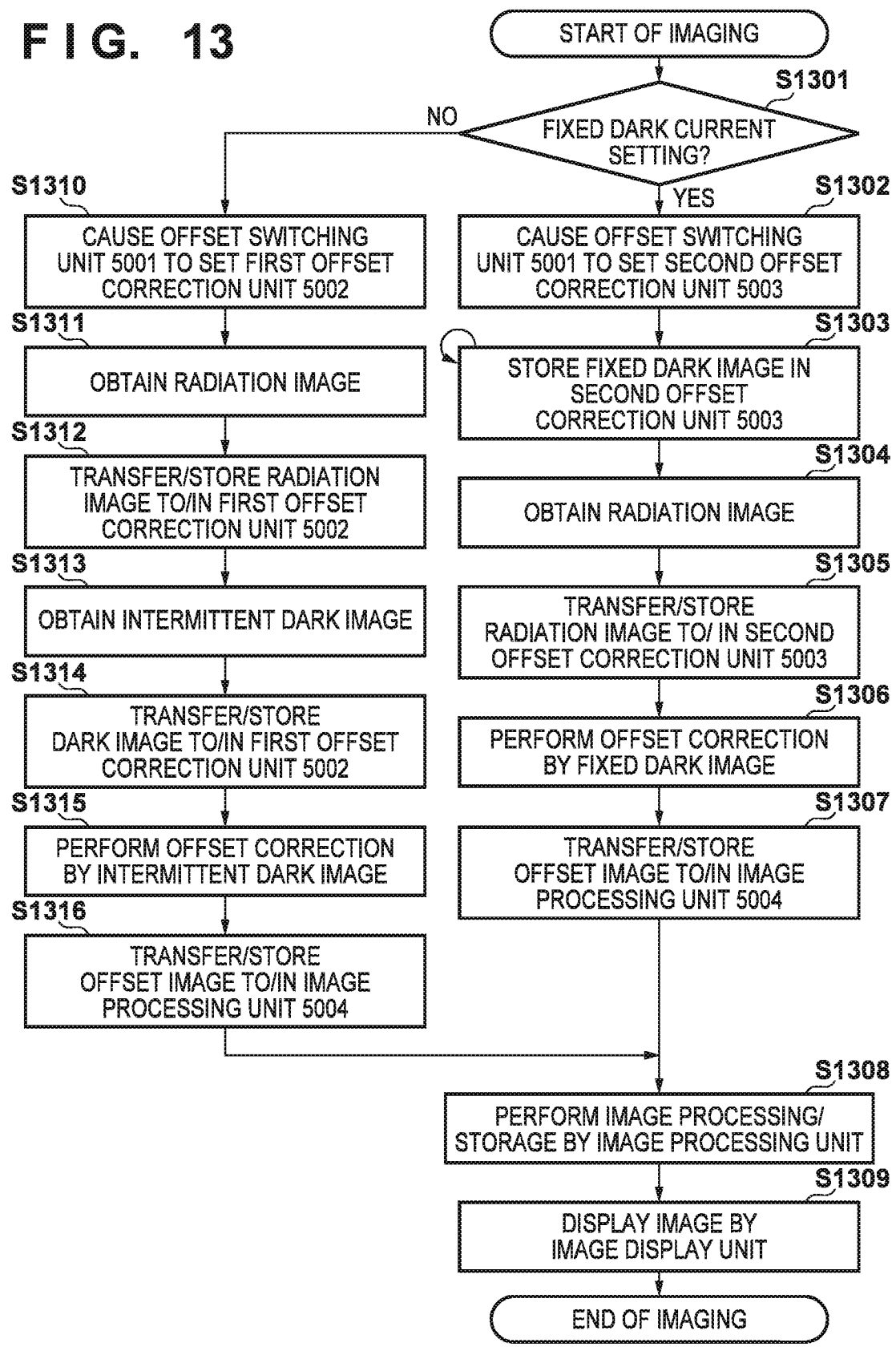
FIG. 13 is a flowchart showing the sequence of an operation according to the fifth embodiment.

FIG. 13 is a flowchart showing the operation sequence of the radiation imaging system according to the fifth embodiment. In step S1301, the communication unit 227 (determination unit) determines a setting of whether the operation setting (imaging mode) of the radiation imaging apparatus 1001 is offset correction using a fixed dark image obtained in advance or offset correction using an intermittent dark image obtained after imaging for a radiation image. If a fixed dark setting is made (YES in step S1301), in step S1302, the offset switching unit 5001 sets offset correction by the second offset correction unit 5003. Next, in step S1303, the fixed dark image obtained in advance is transferred from the offset switching unit 5001 to the second offset correction unit 5003, and the second offset correction unit 5003 stores the obtained fixed dark image.

In step S1303, the second offset correction unit 5003 can obtain a fixed dark image periodically, and then update an image for fixed dark correction. For example, the second offset correction unit 5003 can obtain a plurality of fixed dark images (second dark images) output from the offset switching unit 5001 and generate a fixed dark image obtained by averaging the plurality of fixed dark images. Then, the second offset correction unit 5003 can correct an offset component of a radiation image (second offset correction) by the averaged fixed dark image (second dark image) and an obtained radiation image, and output a corrected offset image. The image for fixed dark correction can be calculated by the controller 1002 having a high processing capability because it is created not only by performing averaging calculation but also by correcting a deficiency pixel which is not a normal output registered in advance, correcting an unexpected abnormal output which is not registered in advance, or the like. A fixed dark update timing in the flowchart is merely an example, and it is possible to generate an image with the reduced influence of a temperature change, a long-term image lag, or the like by updating a fixed dark image at an arbitrary timing without performing radiation imaging frequently.

Then, the radiation imaging apparatus 1001 obtains a radiation image of an object in step S1304, and the offset switching unit 5001 transfers the obtained radiation image to the second offset correction unit 5003, and the second offset correction unit 5003 stores the radiation image in step S1305.

Next, the second offset correction unit 5003 performs offset correction processing by subtracting a stored fixed dark image from a radiation image in step S1306. Then, in steps S1307 and S1308, the second offset correction unit 5003 transfers an offset image having undergone offset correction processing to the image processing unit 5004, and the image processing unit 5004 performs image processing for display on the offset image and stores the image. In step S1309, image data is transferred from the image processing unit 5004 to the image display unit 5005, and the image display unit 5005 performs display control of the image data and displays an image to the operator. As a result, by performing offset correction (fixed dark correction) not with the radiation imaging apparatus 1001 but with the controller 1002, it is possible to perform imaging with suppressed power consumption of the battery unit 1008 in the radiation imaging apparatus 1001 without decreasing an image transfer speed.

If the communication unit 227 determines in step S1301 of the flowchart in FIG. 13 that the fixed dark setting is not made (NO in step S1301), in step S1310, the offset switching unit 5001 sets offset correction by the first offset correction unit 5002. Then, the radiation imaging apparatus 1001 obtains a radiation image of an object in step S1311, and the offset switching unit 5001 transfers the radiation image to the first offset correction unit 5002, and the first offset correction unit 5002 stores the radiation image in step S1312.

Next, the radiation imaging apparatus 1001 performs imaging (obtains) for an intermittent dark image without irradiation with radiation in step S1313, and the offset switching unit 5001 transfers the intermittent dark image to the first offset correction unit 5002, and the first offset correction unit 5002 stores the intermittent dark image in step S1314.

In step S1315, the first offset correction unit 5002 performs offset correction processing by subtracting the stored intermittent dark image from a radiation image. Next, in step S1316, the first offset correction unit 5002 transfers an offset image having undergone offset correction processing to the image processing unit 5004, and the image processing unit 5004 performs image processing for display on the offset image and stores the image.

In step S1309, image data is transferred from the image processing unit 5004 to the image display unit 5005, and the image display unit 5005 performs display control of the image data and displays an image to the operator. As a result, it is possible to perform imaging without decreasing an imaging frame rate by performing offset correction (intermittent dark correction) with the radiation imaging apparatus 1001.

According to this embodiment, by switching between the first offset correction unit of the radiation imaging apparatus and the second offset correction unit of the controller (external apparatus) based on determination of the transfer load in the communication unit, it becomes possible to perform imaging with suppressed power consumption without decreasing the imaging frame rate.

(Sixth Embodiment)

In the sixth embodiment, an arrangement that switches, based on determination of the operation setting (imaging mode) of a radiation imaging apparatus 1001 (radiation imaging unit) as the transfer load of a communication unit 227 that transfers an image from the radiation imaging apparatus 1001 to a controller 1002 (external apparatus), offset correction units (the first offset correction unit and the second offset correction unit) that perform offset correction will be described. That is, in accordance with the imaging mode of the radiation imaging apparatus, a side to perform offset correction processing is switched between the radiation imaging apparatus and the controller (external apparatus). In this embodiment, the arrangements of a radiation imaging system and the radiation imaging apparatus 1001 are the same as in the fifth embodiment.

As an example of the operation setting (imaging mode), the first frame rate imaging (to be referred to as "high frame rate imaging" hereinafter) as imaging at a reference frame rate or the second frame rate imaging (to be referred to as "low frame rate imaging" hereinafter) having a lower frame rate than the first frame rate imaging will be described.

In this embodiment, the communication unit 227 functions as a determination unit and determines the operation setting (imaging mode) of the radiation imaging apparatus 1001. The communication unit 227 (determination unit) determines whether the first frame rate imaging (high frame rate imaging) by the reference frame rate or the second frame rate imaging (low frame rate imaging) having the lower frame rate than the first frame rate imaging is set as the operation setting of the radiation imaging apparatus 1001.

If the first frame rate imaging (high frame rate imaging) is set as the operation setting of the radiation imaging apparatus 1001, the communication unit 227 (determination unit) determines that a setting which causes the transfer load to be equal to or more than a reference load is made. In this case, an offset switching unit 5001 switches offset correction for a radiation image to offset correction by a first offset correction unit 5002 of the radiation imaging apparatus 1001.

If the second frame rate imaging (low frame rate imaging) is set as the operation setting of the radiation imaging apparatus 1001, the communication unit 227 (determination unit) determines that a setting which causes the transfer load not to exceed the reference load is made. In this case, the offset switching unit 5001 switches offset correction for the radiation image to offset correction by a second offset correction unit 5003 of the controller 1002 (external apparatus).

Figure 14:
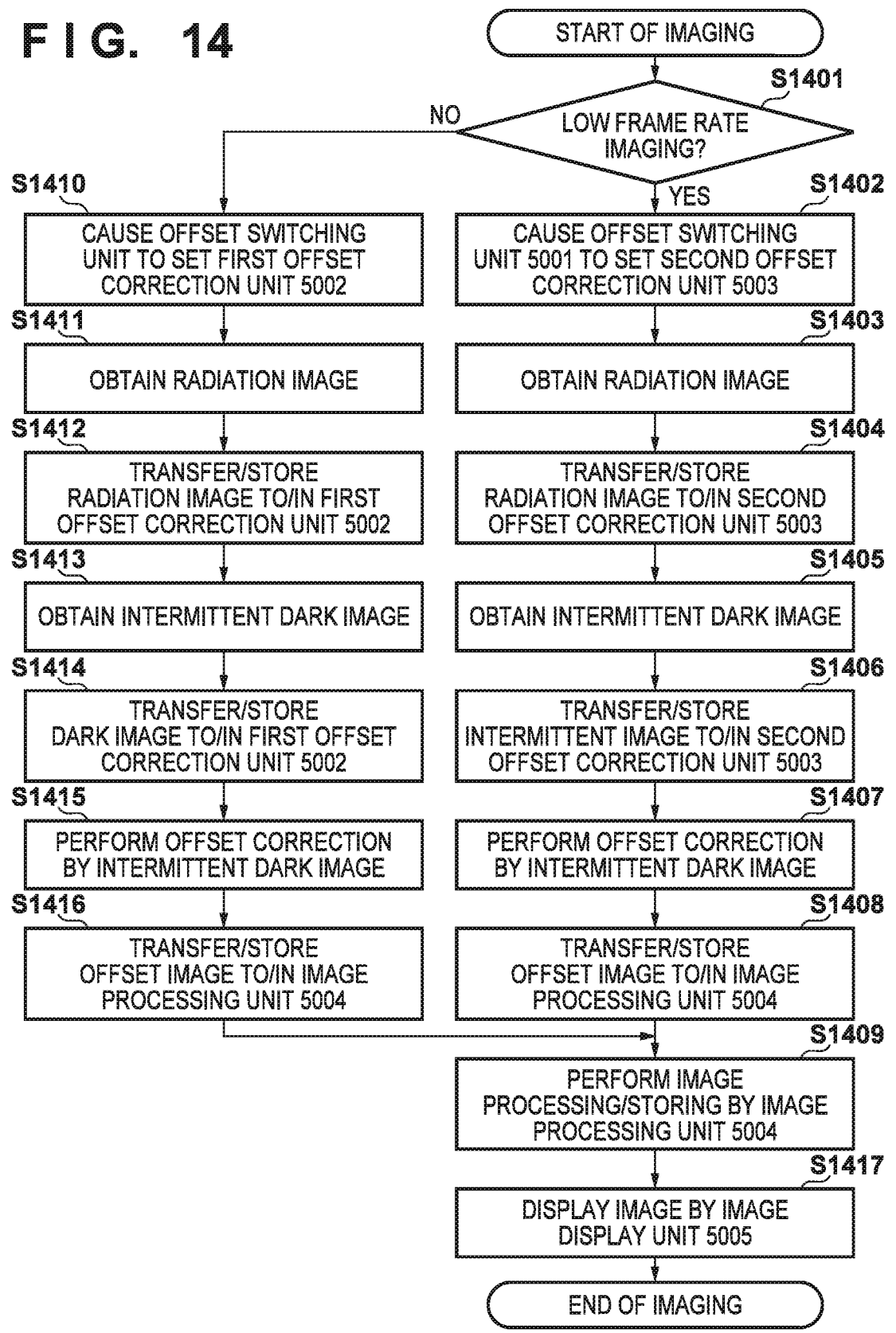
FIG. 14 is a flowchart showing the sequence of an operation according to the sixth embodiment.

FIG. 14 is a flowchart showing the operation sequence of the radiation imaging system according to the sixth embodiment. In step S1401, the communication unit 227 (determination unit) determines whether the operation setting (imaging mode) of the radiation imaging apparatus 1001 is the setting of low frame rate imaging or the setting of high frame rate imaging. If the operation setting is the setting of low frame rate imaging (YES in step S1401), in step S1402, the offset switching unit 5001 sets offset correction by the second offset correction unit 5003 based on determination of the communication unit 227 (determination unit).

Then, the radiation imaging apparatus 1001 obtains a radiation image of an object in step S1403, and the offset switching unit 5001 transfers the obtained radiation image to the second offset correction unit 5003, and the second offset correction unit 5003 stores the radiation image in step S1404.

Next, the radiation imaging apparatus 1001 performs imaging (obtaining) for an intermittent dark image without irradiation with radiation in step S1405, and the offset switching unit 5001 transfers the intermittent dark image to the second offset correction unit 5003, and second offset correction unit 5003 stores the intermittent dark image in step S1406.

In step S1407, the second offset correction unit 5003 performs offset correction processing by subtracting the stored intermittent dark image from a radiation image. Next, in steps S1408 and S1409, the second offset correction unit 5003 transfers an offset image having undergone offset correction processing to an image processing unit 5004, and the image processing unit 5004 performs image processing for display on the offset image and stores the image.

In step S1417, image data is transferred from the image processing unit 5004 to an image display unit 5005, and the image display unit 5005 performs display control of the image data and displays an image to an operator. As a result, by transferring the intermittent dark image at a timing other than transfer of a radiation image, it becomes possible to perform imaging with suppressed power consumption without decreasing a frame rate.

If the communication unit 227 determines in step S1401 of the flowchart in FIG. 14 that the operation setting is not the setting of low frame rate imaging but the setting of high frame rate imaging (NO in step S1401), in step S1410, the offset switching unit 5001 sets offset correction by the first offset correction unit 5002 based on determination of the communication unit 227 (determination unit). Then, the radiation imaging apparatus 1001 obtains a radiation image of an object in step S1411, and the offset switching unit 5001 transfers the obtained radiation image to the first offset correction unit 5002, and the first offset correction unit 5002 stores the radiation image in step S1412.

Next, the radiation imaging apparatus 1001 performs imaging (obtains) for an intermittent dark image without irradiation with radiation in step S1413, and the offset switching unit 5001 transfers the intermittent dark image to the first offset correction unit 5002, and the first offset correction unit 5002 stores the intermittent dark image in step S1414.

In step S1415, the first offset correction unit 5002 performs offset correction processing by subtracting the stored intermittent dark image from a radiation image. Next, in steps S1416 and S1409, the first offset correction unit 5002 transfers an offset image having undergone offset correction processing to the image processing unit 5004, and the image processing unit 5004 performs image processing for display on the offset image and stores the image. In step S1417, image data is transferred from the image processing unit 5004 to the image display unit 5005, and the image display unit 5005 performs display control of the image data and displays an image to the operator. As a result, by performing offset correction (intermittent dark correction) with the radiation imaging apparatus 1001, it is possible to perform imaging without decreasing a frame rate even in high frame rate imaging.

According to this embodiment, in accordance with the operation setting (imaging mode) set in the radiation imaging apparatus 1001, it becomes possible to perform imaging with suppressed power consumption without decreasing a frame rate. By switching between the first offset correction unit of the radiation imaging apparatus and the second offset correction unit of the controller (external apparatus) based on determination of a transfer load in a communication unit, it becomes possible to perform imaging with suppressed power consumption without decreasing an imaging frame rate.

According to the fifth and sixth embodiments, in accordance with the operation setting of the radiation imaging apparatus, it becomes possible to suppress power consumption of a power supply unit by switching between the radiation imaging apparatus and the external apparatus to perform offset correction processing.

<Summary of Fifth and Sixth Embodiments>

A radiation imaging system according to the first aspect is a radiation imaging system comprising:

a radiation imaging apparatus that includes a power supply unit configured to supply operation power, an imaging unit configured to obtain a radiation image of an object, and a first offset correction unit configured to correct an offset component appearing in the radiation image and an external apparatus that includes a second offset correction unit configured to correct an offset component appearing in the radiation image, wherein the radiation imaging apparatus which is driven based on the operation power includes a communication unit configured to transfer an image from the imaging unit to the external apparatus, a determination unit configured to determine a transfer load of the communication unit based on an operation setting for the radiation imaging apparatus, and a switching unit configured to switch, based on determination of the transfer load, offset correction for the radiation image to offset correction by one of the first offset correction unit of the radiation imaging apparatus and the second offset correction unit of the external apparatus, and the switching unit switches offset correction to offset correction by the first offset correction unit if the transfer load is set to be not less than a reference load, and switches offset correction to offset correction by the second offset correction unit if the transfer load is set not to exceed the reference load.

In the second aspect according to the first aspect, the determination unit determines that a setting which causes the transfer load to be not less than the reference load is made if first offset correction by a correction image obtained without irradiation with radiation for each radiation-image imaging operation is set as the operation setting, and the switching unit switches offset correction for the radiation image to offset correction by the first offset correction unit.

In the third aspect according to the first aspect, the determination unit determines that a setting which causes the transfer load not to exceed a reference load is made if second offset correction by a correction image obtained without irradiation with radiation before imaging for the radiation image is set as the operation setting, and the switching unit switches offset correction for the radiation image to offset correction by the second offset correction unit.

In the fourth aspect according to the first aspect, if the first offset correction is set as the operation setting, the switching unit outputs, to the first offset correction unit, a radiation image obtained by the imaging unit and a correction image obtained by the imaging unit on the same condition as imaging for the radiation image without irradiation with radiation after imaging for the radiation image, and the first offset correction unit outputs an offset image having undergone the first offset correction by subtracting the correction image obtained for each of the imaging operations from the radiation image.

In the fifth aspect according to the third aspect, if the second offset correction is set as the operation setting, the switching unit outputs, to the second offset correction unit, a correction image obtained by the imaging unit without irradiation with radiation at a timing before imaging for the radiation image and a radiation image obtained by the imaging unit, and the second offset correction unit outputs an offset image having undergone the second offset correction by subtracting the correction image from the radiation image.

In the sixth aspect according to the first aspect, the determination unit further determines one of first frame rate imaging by a reference frame rate and second frame rate imaging having a lower frame rate than the first frame rate imaging as the operation setting.

In the seventh aspect according to the sixth aspect, the determination unit determines a setting which causes the transfer load to be not less than a reference load if the first frame rate imaging is set as the operation setting, and the switching unit switches offset correction for the radiation image to offset correction by the first offset correction unit.

In the eighth aspect according to the sixth aspect, the determination unit determines a setting which causes the transfer load not to exceed a reference load is made if the second frame rate imaging is set as the operation setting, and the switching unit switches offset correction for the radiation image to offset correction by the second offset correction unit.

In the ninth aspect according to the seventh aspect, if the first frame rate imaging is set as the operation setting, the switching unit outputs, to the first offset correction unit, a radiation image obtained by the imaging unit and a correction image obtained by the imaging unit on the same condition as imaging for the radiation image without irradiation with radiation after imaging for the radiation image, and the first offset correction unit outputs an offset image having undergone offset correction by subtracting the correction image obtained for each of the imaging operations from the radiation image.

In the tenth aspect according to the eighth aspect, if the second frame rate imaging is set as the operation setting, the switching unit outputs, to the second offset correction unit, a radiation image obtained by the imaging unit and a correction image obtained by the imaging unit on the same condition as imaging for the radiation image without irradiation with radiation after imaging for the radiation image, and the second offset correction unit outputs an offset image having undergone offset correction by subtracting the correction image obtained for each of the imaging operations from the radiation image.

In the eleventh aspect according to the third aspect, the second offset correction unit generates a correction image obtained by averaging a plurality of correction images obtained from the switching unit, and outputs an offset image having undergone the second offset correction by subtracting the averaged correction image from the obtained radiation image.

In the twelfth aspect according to the first aspect, the external apparatus further includes an image processing unit configured to perform image processing on offset images output from the first offset correction unit and the second offset correction unit, and a display control unit configured to display the offset images having undergone the image processing on a display unit.

A radiation imaging apparatus according to the thirteenth aspect is a radiation imaging apparatus comprising a power supply unit configured to supply operation power, an imaging unit configured to obtain a radiation image of an object, and a first offset correction unit configured to correct an offset component appearing in the radiation image and is driven based on the operation power, the apparatus comprising:

a communication unit configured to transfer an image from the imaging unit to an external apparatus including a second offset correction unit configured to correct the offset component;

a determination unit configured to determine a transfer load of the communication unit based on an operation setting for the radiation imaging apparatus; and a switching unit configured to switch, based on determination of the transfer load, offset correction for the radiation image to offset correction by one of the first offset correction unit of the radiation imaging apparatus and the second offset correction unit of the external apparatus, and the switching unit switches offset correction to offset correction by the first offset correction unit if the transfer load is set to be not less than a reference load, and switches offset correction to offset correction by the second offset correction unit if the transfer load is set not to exceed the reference load.

A radiation imaging method of a radiation imaging apparatus according to the fourteenth aspect is a radiation imaging method of a radiation imaging apparatus including a power supply unit configured to supply operation power, an imaging unit configured to obtain a radiation image of an object, and a first offset correction unit configured to correct an offset component appearing in the radiation image and being driven based on the operation power, the method comprising:

transferring, by a communication unit of the radiation imaging apparatus, an image from the imaging unit to an external apparatus including a second offset correction unit configured to correct the offset component;

determining, by a determination unit of the radiation imaging apparatus, a transfer load of the communication unit based on an operation setting for the radiation imaging apparatus; and switching, by a switching unit of the radiation imaging apparatus, based on determination of the transfer load, offset correction for the radiation image to offset correction by one of the first offset correction unit of the radiation imaging apparatus and the second offset correction unit of the external apparatus, and in the switching, offset correction is switched to offset correction by the first offset correction unit if the transfer load is set to be not less than a reference load, and offset correction is switched to offset correction by the second offset correction unit if the transfer load is set not to exceed the reference load.

A non-transitory computer-readable storage medium according to the fifteenth aspect is a storage medium storing a computer program for causing a computer to execute respective steps of a radiation imaging method according to the fourteenth aspect.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-075446, filed Apr. 5, 2017 and Japanese Patent Application No. 2017-077733, filed Apr. 10, 2017, which are hereby incorporated by reference herein in their entirety.

What is claimed is:

1. A radiation imaging apparatus having a battery and being operable in at least two of a plurality of power supply forms including the battery and an external power source, the apparatus comprising: a power control unit configured to determine the power supply form; and a control unit configured to control an operation of the radiation imaging apparatus, wherein in accordance with the power supply form, the control unit switches between a first obtaining mode of obtaining offset correction data after imaging of an object for each imaging of the object and a second obtaining mode of obtaining offset correction data obtained in advance before imaging of an object is done, and the control unit switches to the first obtaining mode if power is supplied from the battery and switches to the second obtaining mode if power is supplied from the external power source.

2. The apparatus according to claim 1, wherein the control unit switches to the first obtaining mode if power is supplied from the battery, and a predetermined time period has elapsed since an operation by power supply from the battery.

3. The apparatus according to claim 1, wherein the control unit switches to the second obtaining mode if power is supplied from the battery, and a predetermined time period has not elapsed since an operation by power supply from the battery.

4. The apparatus according to claim 1, wherein the control unit switches to the first obtaining mode if power is supplied from the battery, and a remaining capacity of the battery is not more than a predetermined amount.

5. The apparatus according to claim 1, wherein the control unit switches to the second obtaining mode if power is supplied from the battery, and a remaining capacity of the battery is more than a predetermined amount.

6. The apparatus according to claim 1, wherein the control unit switches to the first obtaining mode if power is supplied from the battery, and the requested number of frames is not less than a predetermined number.

7. The apparatus according to claim 1, wherein the control unit switches to the second obtaining mode if power is supplied from the battery, and the requested number of frames is less than a predetermined number.

8. The apparatus according to claim 1, further comprising:
a reception unit configured to receive an imaging mode; and
an obtaining unit configured to obtain offset correction data corresponding to the imaging mode in one of the first obtaining mode and the second obtaining mode.

9. The apparatus according to claim 8, wherein the obtaining unit obtains the offset correction data during continuous imaging of the object in the first obtaining mode.

10. The apparatus according to claim 8, wherein the obtaining unit generates the offset correction data from a plurality of non-exposure image data.

11. A radiation imaging system comprising:
a radiation imaging apparatus defined in claim 1;
a radiation source configured to irradiate the radiation imaging apparatus with radiation;
an input apparatus configured to accept an input of an imaging mode of the radiation imaging apparatus; and
a display apparatus configured to display information on obtaining modes including the first obtaining mode and the second obtaining mode.

12. A control method of a radiation imaging apparatus having a battery and being operable in at least two of a plurality of power supply forms including the battery and an external power source, the method comprising: determining the power supply form; and controlling an operation of the radiation imaging apparatus, wherein in the controlling, in accordance with the power supply form, switching between a first obtaining mode of obtaining offset correction data after imaging of an object for each imaging of the object and a second obtaining mode of obtaining offset correction data obtained in advance before imaging of an object is done.

13. A non-transitory computer-readable storage medium storing a computer program for causing a computer to execute respective steps of a control method of a radiation imaging apparatus having a battery and being operable in at least two of a plurality of power supply forms including the battery and an external power source, the method comprising: determining the power supply form; and controlling an operation of the radiation imaging apparatus, wherein in the controlling, in accordance with the power supply form, switching between a first obtaining mode of obtaining offset correction data after imaging of an object for each imaging of the object and a second obtaining mode of obtaining offset correction data obtained in advance before imaging of an object is done, and in the controlling, switching to the first obtaining mode is done if power is supplied from the battery and switching to the second obtaining mode is done if power is supplied from the external power source.

* * * * *